United States Patent [19]

Goto

[11] Patent Number: 5,617,429
[45] Date of Patent: Apr. 1, 1997

[54] FAILURE DETECTION SYSTEM FOR DETECTING FAILURE OF FUNCTIONAL BLOCKS OF INTEGRATED CIRCUITS

[75] Inventor: Kouji Goto, Itami, Japan

[73] Assignee: Mitsubishi Denki Kabushiki Kaisha, Tokyo, Japan

[21] Appl. No.: 291,751

[22] Filed: Aug. 16, 1994

[51] Int. Cl.⁶ ............................................. G06F 11/26
[52] U.S. Cl. ............................................. 371/25.1
[58] Field of Search ................... 371/25.1, 22.3, 371/21.1, 27, 22.1; 365/201; 324/73.1, 537; 395/800; 360/72.2; 364/933, 940, 942, 950

[56] References Cited

U.S. PATENT DOCUMENTS

| | | | |
|---|---|---|---|
| 4,745,540 | 5/1988 | Hamada et al. | 364/140 |
| 4,794,597 | 12/1988 | Ooba et al. | 371/3 |
| 4,862,071 | 8/1989 | Sato et al. | 324/73 R |
| 4,870,345 | 9/1989 | Tomioka et al. | 371/22.3 |
| 4,974,226 | 11/1990 | Fujimori et al. | 371/22.3 |
| 4,995,039 | 2/1991 | Sakashita et al. | 371/22.3 |
| 5,043,990 | 8/1991 | Doi et al. | 371/68.1 |
| 5,164,918 | 11/1992 | Ogino et al. | 365/201 |
| 5,170,398 | 12/1992 | Fujieda et al. | 371/27 |

FOREIGN PATENT DOCUMENTS

| | | |
|---|---|---|
| 0046404 | 2/1982 | European Pat. Off. |
| 2441486 | 8/1975 | Germany |

*Primary Examiner*—Robert W. Beausoliel, Jr.
*Assistant Examiner*—Stephen C. Elmore
*Attorney, Agent, or Firm*—Oblon, Spivak, McClelland, Maier & Neustadt, P.C.

[57] ABSTRACT

A detection unit (46) detects an input pattern stored in an input pattern storage (45) corresponding to a signal inputted to a random logic unit (2). An expected pattern responsive to the input pattern detected by the detection unit (46) is transmitted from the expected pattern storage (52) to a comparator (6). The comparator (6) compares an output from the random logic unit (2) with the expected pattern, and then an error processing circuit (7) processes the comparison result. The error processing circuit (7) stores the details of the error in an error register (8), and makes the data in the register (8) transmittable through a data bus (34) to the outside of a failure detection circuit (101*b*). The information concerning the error is processed statistically and the data stored in the input pattern storage (45) and expected pattern storage (52) are properly rewritten, so that an improvement in failure detection ration can be achieved.

21 Claims, 19 Drawing Sheets

FIG. 13A
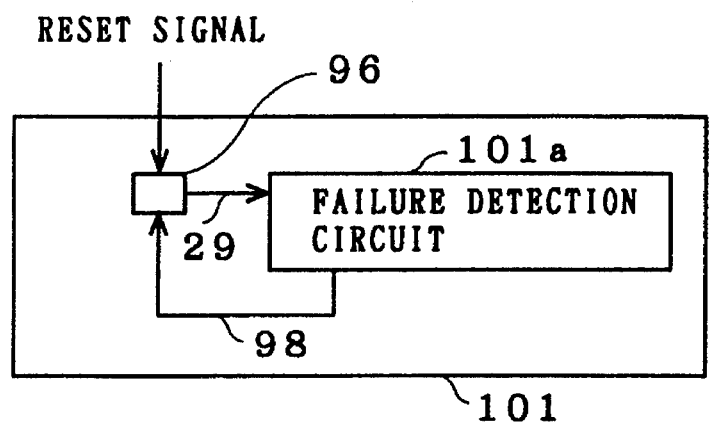
FIG 13B
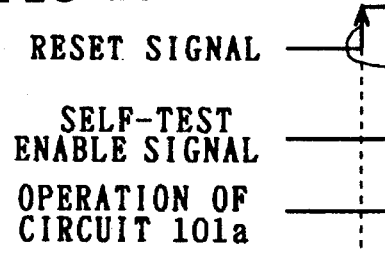
FIG 13C
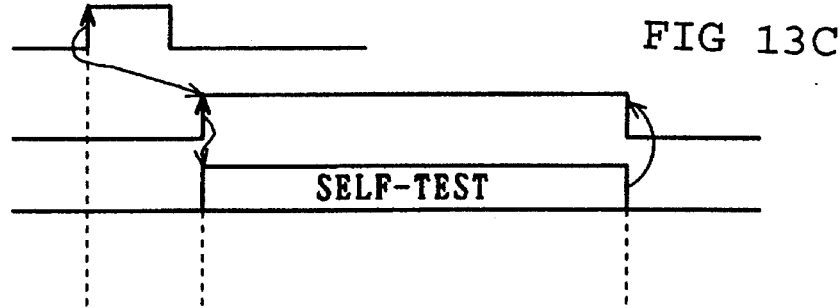
FIG 13D

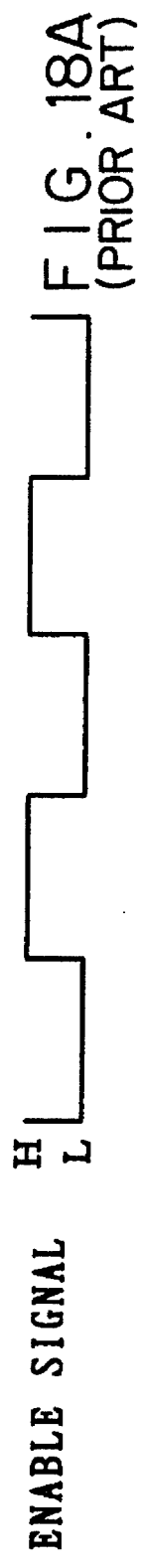
FIG. 18A (PRIOR ART) ENABLE SIGNAL
FIG. 18B (PRIOR ART) SELF-TEST ENABLE SIGNAL
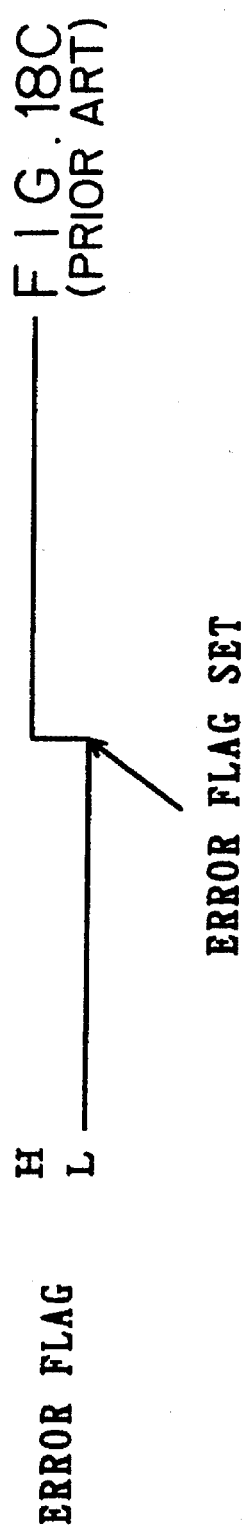
FIG. 18C (PRIOR ART) ERROR FLAG — ERROR FLAG SET

FAILURE DETECTION SYSTEM FOR DETECTING FAILURE OF FUNCTIONAL BLOCKS OF INTEGRATED CIRCUITS

BACKGROUND OF THE INVENTION

1. Field of the Invention

The present invention relates in general to a failure detection system which performs failure detection of an integrated circuit, and more particularly to a failure detection system which is capable of performing dynamic failure detection of the integrated circuit when high reliability is required of the integrated circuit.

2. Description of the Background Art

Generally, it is not easy for an apparatus to make a judgment whether or not an integrated circuit included therein always performs a normal operation. In other words, the surroundings such as temperature, electric field, magnetic field, electromagnetic radiation and density of radioactive rays change dynamically, so that it is difficult to check if the apparatus is disposed in such surroundings as ensure a normal operation for the apparatus. As to malfunction of the integrated circuit, which is one of major factors to cause malfunction of the apparatus, it generally has great difficulty to be detected without special measures. Thus, there arises a need of failure detection of the integrated circuit by employing a failure detection system, and thus the failure detection system therefore is disclosed in Japanese Patent Application Laid Open Gazette 1-193942 and the like.

Referring to FIGS. 14 to 19, a conventional failure detection system will be described. FIG. 14 illustrates a configuration of an apparatus including an integrated circuit. In FIG. 14, reference numerals 101 and 102 denote devices including integrated circuits with different functions, and numeral 103 denotes a central processing unit (hereinafter referred to as "CPU") which controls the devices 101 and 102. Reference numeral 104 denotes a control signal bus for transmitting control signals such as read/write signal, chip enable signal and self-test enable signal, reference numeral 105 denotes a data signal bus for transmitting data signals and numeral 106 denotes an address signal bus for transmitting address signals.

In the apparatus of FIG. 14, the devices 101 and 102 comprise failure detection circuits 101a and 102a, respectively, to detect failure of the integrated circuits incorporated therein. The CPU 103 performs control operations associated with read/write, self-test and the like through the control signal bus 104, the data signal bus 105 and the address signal bus 106. Moreover, the devices 101 and 102 perform error check of the respective integrated circuits by self-test.

FIG. 15 is a block diagram showing, e.g., a configuration of the conventional failure detection circuit 101a. In FIG. 15, reference numeral 1 denotes an input signal conductor disposed within the integrated circuit so as to transmit data to a function (e.g., an ALU in a microprocessor) in the integrated circuit (e.g., a microprocessor). Reference numeral 2 denotes a random logic unit (functional block) provided within the integrated circuit for performing a predetermined function in response to the data inputted thereto through the input signal conductor 1, and numeral 3 denotes an output signal conductor for outputting a result of logical operation and the like given by the random logic unit 2 to other functions within the integrated circuit or to the outside thereof. The input signal conductor 1 and the output signal conductor 3 usually have a plurality of lines, respectively, corresponding to the number of bits of the signal.

Reference numeral 4 denotes a test comparison ROM for storing expected data to be outputted in response to the input of the random logic unit 2. Reference numeral 5 denotes a ROM address generating unit for generating an address of the test comparison ROM 4 when the self-test is conducted. Reference numeral 6 denotes a comparator for comparing an output from the random logic unit 2 with a pattern stored in the test comparison ROM 4, to output a signal indicating agreement or disagreement to a signal conductor 11.

Reference numeral 22 denotes a test pattern ROM for storing an input pattern used for the self-test in the failure detection circuit 101a and outputting the test pattern to a signal conductor 23 according to an address signal which is generated in the ROM address generating unit 5 and then delivered through a signal conductor 24. Reference numeral 30 denotes a selector which receives a signal delivered through the signal conductor 23 and a signal delivered through the input signal conductor 1, and then outputs either of the signal delivered through the signal conductor 23 and the signal delivered through the input signal conductor 1 in response to the enable signal and the self-test enable signal applied respectively through signal conductors 28 and 29 to a signal conductor 25 connected to the random logic unit 2. Reference numeral 27 denotes a switch for making a choice whether or not to transmit an output signal applied from the random logic unit 2 through a signal conductor 26 to the output signal conductor 3.

FIG. 16 shows an exemplary configuration of the selector 30. In FIG. 16, L1 denotes an invertor for outputting the inverted logic of the enable signal inputted through the signal conductor 28. L2 denotes an OR gate having two inputs for receiving the enable signal and the self-test enable signal by the two inputs through the signal conductors 28 and 29 respectively. L3 denotes an AND gate having three inputs for receiving an output from the invertor L1, the input pattern for the self-test delivered through the signal conductor 23 and an output from the OR gate L2 by the three inputs, respectively. L4 denotes an AND gate having two inputs for receiving an input signal delivered through the input signal conductor 1 and the enable signal delivered through the signal conductor 28 by the two inputs, respectively. L5 denotes an OR gate for taking a logical sum of outputs from the And gates L3 and L4 to output it. Reference numerals 30a to 30d denote selectors for one bit and each have the same circuit configuration so as to selectively output one bit of the input signal delivered through the input signal conductor 1 or one bit of the input pattern delivered through the signal conductor 23. The selector 30a, for example, consists of the AND gates L3 and L4 and the OR gate L5.

The operation of the selector 30 will be described. When the enable signal applied through the signal conductor 28 is at high level, at least one of the three inputs of the AND gate L3 takes low level and one of the two inputs of the AND gate L4 takes high level, so that the selector 30 always applies the signal of the input signal conductor 1 to the signal conductor 25.

On the other hand, when the enable signal is at low level, if the self-test enable signal applied through the signal conductor 29 is at high level, the selector 30 applies the signal of the signal conductor 23 to the signal conductor 25, and otherwise outputs a signal of low level to the signal conductor 25.

Next, FIG. 17 shows an exemplary configuration of the switch 27. The switch 27 consists of a plurality of AND gates L61 to L63 each having two inputs and taking one bit out of the signal of the signal conductor 28 by one input and one bit out of the output signal from the random logic unit 2 corresponding to the enable signal by the other input. Thus, the signal conductor 26 transmits the output signal from the random logic unit 2 of FIG. 15 and is connected to the input of the switch 27. Outputs of the AND gates L61 to L64 are connected to the output signal conductor 3. When the enable signal delivered through the signal conductor 28 is at high level, the switch 27 transmits the signal applied through the signal conductor 26 connected to the random logic unit 2 to the output signal conductor 3 and otherwise outputs a signal of low level to the output signal conductor 3.

The operation of the failure detection circuit 101a will be described. The random logic unit 2 processes the signal of the input signal conductor 1 to output the processed result to the output signal conductor 3. It is assumed that the output is uniquely determined depending on the input. The integrated circuit including the random logic unit 2 carries out an operation by reading out the processed result of the random logic unit 2, which is obtained in response to the data inputted thereto through the input signal conductor 1, through the output signal conductor 3.

The integrated circuit is intermittently used by the CPU 103 which is disposed outside and connected to the device 101 incorporating the integrated circuit therein. FIG. 18 is a timing chart showing the states. As can be seen from the figure, the enable signal periodically attains low level. While the enable signal is low level, the self-test enable signal attains high level. While the CPU 103 uses the integrated circuit, the signal conductor 28 keeps high level. Accordingly, the selector 30 transmits the signal of the input signal conductor 1 to the random logic unit 2, and the switch 27 outputs the processed result of the random logic unit 2 to the output signal conductor 3. In this case, the integrated circuit carries out a normal operation without conducting the self-test.

When the enable signal is at low level and the self-enable signal is at high level, the integrated circuit performs the self-test instead of normal operation. The failure detection circuit 101a carries out the following process in order to check if the random logic unit 2 outputs a proper output in response to an input.

When the enable signal is at low level and the self-test enable signal is at low level, the selector 30 outputs a signal of low level to the signal conductor 25. When the enable signal is at low level and the self-test enable signal is at high level, the ROM address generating unit 5 generates the address signal of the test comparison ROM 4 to output it to the signal conductor 9 and signal conductor 24. The address signal is inputted through the signal conductor 24 to the test pattern ROM 22, and then one of the input patterns stored in the test pattern ROM 22 is outputted to the signal conductor 23. At the same time, the test comparison ROM 4 outputs an expected pattern corresponding to the address signal inputted through the signal conductor 9, i.e., the input pattern outputted from the test pattern ROM 22, to a signal conductor 10. Since the selector 30 transmits the signal of the signal conductor 23 to the signal conductor 25, the output from the test pattern ROM 22 is inputted to the random logic unit 2 and then the processed result of the random logic unit 2 is outputted to the signal conductor 26. The comparator 6 receives the processed result and the expected pattern, and compares these two signals to output a signal indicating agreement or disagreement outside through the signal conductor 11.

In the above-mentioned failure detection system, the self-test may be performed immediately after the integrated circuit is reset. Furthermore, in the case that the apparatus always or for long time uses the integrated circuit exclusively, there may be an arrangement where a timer provided within the integrated circuit applies a self-test request signal to the outside CPU 103 after the lapse of a certain period so that the apparatus can periodically start the self-test of the integrated circuit.

In the conventional failure detection system, if the random logic unit 2 includes a register, data in the register are saved temporarily in a memory just before the self-test is started, and then data for the self-test are loaded in the register to conduct the self-test. After the self-test, the saved data are restored from the temporary memory to the register to perform an ordinary operation.

When the random logic unit 2 processes data under control of the CPU 103, such a configuration as shown in FIG. 19 makes it possible to start the self-test by interruption.

In FIG. 19, reference numeral 2a denotes a random logic for performing a logical operation within the random logic unit 2, 2b denotes a register for temporarily storing the data inputted to the random logic 2a from the outside through the signal conductor 25, and 2c denotes a register for temporarily storing the data processed in the random logic 2a to be outputted through the signal conductor 26. Reference numeral 31 denotes an address signal bus for transmitting an address signal indicating where the data are delivered from the registers 2b and 2c and a memory, and numeral 32 denotes a read/write signal bus for transmitting a read/write signal directing the registers 2b and 2c and the memory to turn into whether read-out mode or write mode.

Reference numeral 33 denotes the memory for saving the data stored in the registers 2b and 2c when the self-test is conducted and numeral 34 denotes a data bus provided within the integrated circuit, for transmitting the data stored in the registers 2b and 2c to the memory 33 and transmitting the data stored in the memory 33 to the registers 2b and 2c.

Reference numeral 35 denotes a timer provided within the integrated circuit, which counts down in synchronization with clocks CLK inputted thereto, and after the lapse of predetermined period, outputs an interrupt signal INT from the signal conductor 36 through the control bus 104 to the CPU 103 shown in FIG. 14 so that the random logic unit 2 may start the self-test periodically.

When the timer 35 receives a signal indicating an end of the self-test from the ROM address generating unit 5 through a signal conductor 37, it reads out the value stored in a reload register 38 and starts again counting down in synchronization with the clocks CLK. After the lapse of predetermined period, the timer outputs the interrupt signal INT to the CPU 103 shown in FIG. 13 from the signal conductor 36 through the control signal bus 104 of FIG. 14.

When the CPU 103 receives the interrupt signal INT, it makes the signal conductor 28 low level to release the device 101 from which the interrupt signal has been outputted. The CPU 103 makes the signal conductor 29 high level. The device 101 conducts the self-test while being released.

The read/write signal is switched so that the data stored in the registers 2b and 2c should be outputted to the data bus 34. Accordingly, the data which have not been processed yet by the random logic 2a are outputted from the register 2b through the data bus 34 to be stored in the memory 33 at a predetermined, for example, address 33a, while the data which have been processed by the random logic 2a, i.e., which have not been processed by other parts of the integrated circuit are outputted from the register 2c through the data bus 34 to be stored in the memory 33 at, for example, an address 33b.

When the signal conductor 28 becomes low level and the signal conductor 29 becomes high level at the same time, the selector 30 is switched so that the signal conductors 23 and 25 should be connected to each other. The ROM address generating unit 5 outputs the address signal to the test comparison ROM 4 and the test pattern ROM 22 in sequence through the signal conductors 9 and 24 respectively, and then the test pattern ROM 22 outputs the input pattern corresponding to the address signal through the signal conductor 23 to the random logic unit 2, while the test comparison ROM 4 outputs the expected data through the signal conductor 10 to the comparator 6. The comparator 6 compares the data processed by the random logic unit 2 with the expected data and then outputs the comparison result of agreement or disagreement through the signal conductor 11.

At the end of the self-test, the ROM address generating unit 5 outputs a signal indicating the end of the self-test to the timer 35 and the CPU 103 of FIG. 14 through the signal conductor 37. The timer 35 is thereby initialized and then begins to measure the time in order to start the next self-test. The CPU 103 makes the signal conductor 29 low level.

When the signal conductor 29 becomes low level and thus the self-test is completed, the CPU 103 outputs the address signal and the read/write signal through the address bus 31 and the read/write signal bus 32, respectively, so that the data of the memory 33 which have been stored in the registers 2b and 2c before the self-test can be restored. At the time when the data are restored in the registers 2b and 2c, the CPU 103 starts operation again by making the enable signal high level.

Next, when the CPU 103 makes the signal conductor 28 high level, the selector 30 connects the input signal conductor 1 to the signal conductor 25 and then the switch 27 turns on, thereby turning the random logic unit 2 into ordinary data processing mode.

The conventional failure detection system having the foregoing arrangement has the problem that it can not respond the variation of error occurrence ratio of input patterns depending on the conditions under which it is used and therefore can not accomplish a self-test of high error detection ratio because the failure detection system performs a dynamic error detection by using fixed input patterns stored in the test pattern ROM 22.

Moreover, there is another problem that it is impossible to check if the failure detection system which conducts the self-test has malfunction.

SUMMARY OF THE INVENTION

The present invention is directed to a failure detection system for detecting failure of at least one functional block provided within an integrated circuit. According to the first aspect of the present invention, the failure detection system comprises: monitoring means having a memory for storing information of at least one predetermined signal, for monitoring an input signal which is inputted to the at least one functional block to be processed therein and giving a notification that specific one of at least one predetermined signal is inputted, when the input signal is in agreement with the specific one; expected value storage means connected to the monitoring means, for storing data concerning a signal which is expected to be outputted from the at least one functional block if the at least one predetermined signal is properly processed by the at least one functional block, and outputting data corresponding to the specific one which is notified by the monitoring means; comparator means for comparing an output signal from the at least one functional block with the data outputted from the expected value storage means and outputting a comparison result; and processing means for receiving the comparison result, and rewriting information of the at least one predetermined signal stored in the monitoring means and the data stored in the expected value storage means corresponding to the at least one predetermined signal based on at least one of the specific one, the output signal and the data outputted from the expected value storage means, on the occasion that the comparison result indicates disagreement.

The monitoring means according to the first aspect of the present invention monitors the signal which is inputted to the at least one functional block to be tested and gives a notification to the expected value storage means when the specified predetermined signal, i.e., the predetermined signal used for detecting failure is inputted.

The expected storage means outputs the data concerning the expected value to be outputted if the predetermined signal is properly processed in the at least one functional block. At this time, the at least one functional block processes the predetermined signal.

Accordingly, the comparator means receives the outputted signal from the at least one functional block and the output data from the expected value storage means, which should be in agreement if the at least one functional block performs a normal operation. Then, the comparator means makes a comparison between them and outputs the comparison result indicating agreement or disagreement.

The processing means carries out, e.g., a statistic process based on at least one of the specific predetermined signal inputted to the at least one functional block, the output signal from the at least one functional block and the data outputted from the expected value storage means when the comparison result indicates disagreement, i.e., when the at least one functional block is assumed not to perform a normal operation, and then rewrites the predetermined signal stored in the monitoring means and the data corresponding to the predetermined signal in the expected value storage means.

In other words, since the statistical information concerning the sorts of error is obtained on real time, it is possible to make dynamic reprogramming, during its operation, of the patterns used for the self-test of the integrated circuit into patterns of high frequency of error according to the situation.

According to the first aspect of the present invention, the failure detection system comprises the processing means which receives the comparison result from the comparator means and when the comparison result shows disagreement, rewrites information of the predetermined signal in the monitoring means and the data in the expected value storage means corresponding to the predetermined signal based on at least one of the specific predetermined signal, the output signal and the output data from the expected value storage means, so that it is possible to dynamically obtain statistical information on the sorts of error, to replace the predetermined signal in the monitoring means and the data in the expected value storage means with the signal and data of high frequency of disagreement shown by the comparator means according to the situation. Therefore, an effect that a failure detection system of high detection ratio is obtained without enlarging its scale so much can be achieved.

In the second aspect of the present invention, the failure detection system comprises: monitoring means for monitoring an input signal inputted to the at least one functional block to be processed therein and giving a notification that specific one of predetermined signals is inputted when the input signal is in agreement with the specific one; expected value storage means connected to the monitoring means, for storing data concerning a signal which is expected to be outputted from the at least one functional block if the specific predetermined signal is properly processed by the at least one functional block, and outputting data corresponding to the specific predetermined signal which is notified by the monitoring means; comparator means for comparing an output signal from the at least one functional block with the data outputted from the expected value storage means and outputting a comparison result; and malfunction verification means provided between the expected value storage means and the comparator means, for making a choice whether or not to change the data outputted from the expected value storage means to the comparator means.

The monitoring means according to the second aspect of the present invention monitors the signal which is inputted to the at least one functional block to be tested and gives a notification to the expected value storage means when the predetermined signal used for failure detection is inputted. The expected storage means outputs the data concerning the expected value to be outputted if the predetermined signal is properly processed in the at least one functional block. At this time, the at least one functional block processes the specific predetermined signal.

Accordingly, the comparator means receives the outputted signal from the at least one functional block and the output data from the expected value storage means, which should be in agreement if the at least one functional block performs a normal operation. Then, the comparator means makes a comparison between them and outputs the comparison result indicating agreement or disagreement.

The malfunction verification means changes the output data from the expected value storage means and outputs the changed data to the comparator means. If the integrated circuit and the failure detection system both perform normal operations, the comparison conducted by the comparator means between the output signal from the at least one functional block and the output data from the expected value storage means should result in disagreement. If not in disagreement, it can be judged that the failure detection system may have malfunction.

It is also possible to perform an ordinary failure detection by outputting the output data from the expected value storage means without changing to the comparator means.

According to the second aspect of the present invention, the failure detection system comprises the malfunction verification means provided between the expected value storage means and the comparator means, to make a choice whether to change the output data from the expected value storage means to output the changed data to the comparator means or to output the output data from the expected value storage means to the comparator means without changing, so that it is possible to check if the failure detection system performs a normal operation. Therefore, a failure detection system of high reliability can be effectively achieved.

In the third aspect of the present invention, the failure detection system comprises: monitoring means for monitoring an input signal inputted to the at least one functional block to be processed therein and giving a notification that specific one of a plurality of predetermined signals is inputted when the input signal is in agreement with the specific one; expected value storage means connected to the monitoring means, for storing data concerning signals which are expected to be outputted from the at least one functional block if the plurality of predetermined signals are properly processed by the at least one functional block, having a discrimination means for discriminating predetermined signals which correspond to the same signal which is expected to be outputted among the plurality of predetermined signals, and outputting data corresponding to the specific one which is notified by the monitoring means; and comparator means for comparing an output signal from the at least one functional block with the data outputted from the expected value storage means and outputting a comparison result.

The monitoring means according to the third aspect of the present invention monitors the signal which is inputted to the at least one functional block to be tested and gives a notification to the expected value storage means when the specified predetermined signal, i.e., the predetermined signal used for detecting failure is inputted. The expected storage means outputs the data concerning the expected value to be outputted if the predetermined signal is properly processed in the at least one functional block. At this time, the at least one functional block processes the specific predetermined signal.

Accordingly, the comparator means receives the outputted signal from the at least one functional block and the output data from the expected value storage means, which should be in agreement if the at least one functional block performs a normal operation. Then, the comparator means makes a comparison between them and outputs the comparison result of agreement or disagreement.

In the expected value storage means, when the predetermined signals and the expected data make a plural-to-one correspondence in the self-test by the failure detection system, the expected data of the same value in the expected value storage means are cut all but one by the discrimination means which discriminates some predetermined signals which correspond to the same signal which is expected to be outputted among the plurality of predetermined signals, thereby reducing the amount of data to be stored in the expected value storage means.

According to the third aspect of the present invention, the failure detection system comprises the expected value storage means which stores the data concerning the signal to be outputted from the at least one functional block if the predetermined signal is properly processed by the at least one functional block, having the discrimination means connected to the monitoring means to discriminate some predetermined signals which correspond to the same signal which is expected to be outputted among a plurality of predetermined signals, and outputs the data corresponding to the specific predetermined signal notified by the monitoring means, so that the data in the expected value storage means which correspond to a plurality of the predetermined signals are cut all but one, thereby simplifying the structure to store the data in the expected value storage means.

In the fourth aspect of the present invention, the failure detection system comprises: monitoring means for monitoring an input signal inputted to the at least one functional block to be processed therein and giving a notification that specific one of predetermined signals is inputted when the input signal is in agreement with the specific one; expected value storage means connected to the monitoring means, for storing data concerning a signal which is expected to be outputted from the at least one functional block if the predetermined signal is properly processed by the at least one functional block, and outputting data corresponding to the specific predetermined signal which is notified by the monitoring means; comparator means for comparing an output signal from the at least one functional block with the data outputted from the expected value storage means and outputting a comparison result; and processing means having a timer for indicating time for use of the integrated circuit, for outputting data indicating the time for use of the integrated circuit at the moment when the comparison result indicates disagreement and at least one of the specific predetermined signal which is notified by the monitoring means, the output signal from the at least one functional block and the data outputted from the expected value storage means, on the occasion that the comparison result indicates disagreement.

The monitoring means according to the fourth aspect of the present invention monitors the signal which is inputted to the at least one functional block to be tested and gives a notification to the expected value storage means when the predetermined signal used for detecting failure is inputted. The expected storage means outputs the data concerning the expected value to be outputted if the predetermined signal is properly processed in the at least one functional block. At this time, the at least one functional block processes the specific predetermined signal.

Accordingly, the comparator means receives the outputted signal from the at least one functional block and the output data from the expected value storage means, which should be in agreement if the at least one functional block performs a normal operation. Then, the comparator means makes a comparison between them and outputs the comparison result of agreement or disagreement.

The processing means outputs the time for use of the integrated circuit given by the timer at the moment when the comparator means gives the comparison result of disagreement, and at the same time, also outputs at least one of the predetermined signal notified by the monitoring means, the output signal of the at least one functional block and the data outputted from the expected value storage means on the occasion that the comparison result indicates disagreement. Therefore, by using the time at the moment of disagreement and at least one of the predetermined signal, the output signal and the output data from the expected value storage means on the occasion of the disagreement, i.e., the occurrence of error, it is possible to distinguish proper data from wrong data among all the data which have been processed until the error occurs.

According to the fourth aspect of the present invention, the failure detection system comprises the processing means having the timer indicating the time for use of the integrated circuit, to output the time at the moment when the comparison result shows disagreement and at least one of the predetermined signal notified by the monitoring means, the output signal from the at least one functional block and the output data from the expected value storage means on the occasion that the comparison result shows disagreement, so that it is possible to distinguish between the proper data and the wrong data among all the data which have been processed in the integrated circuit until the error occurs, thereby facilitating a recovery after the occurrence of failure.

Accordingly, the object of the present invention is to provide a failure detection system which achieves a self-test of high detection ratio responsive to various situations without greatly enlarging its scale by conducting the self-test while the integrated circuit is in operation by itself or not used by the apparatus. The self-test is conducted to detect malfunction of the integrated circuit and to notify the apparatus of the occurrence of error and which functional block and which pattern concern the occurrence of error so that the apparatus can dynamically obtain statistical information on the kinds of error on real time.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 13A and 13B–13D are views illustrating a configuration of a device used for the failure detection system and signal timing charts of the present invention;

FIGS. 18A–18C are a timing charts illustrating a signal for controlling the conventional failure detection circuit and an output of the failure detection circuit.

DESCRIPTION OF THE PREFERRED EMBODIMENTS

Figure 1:
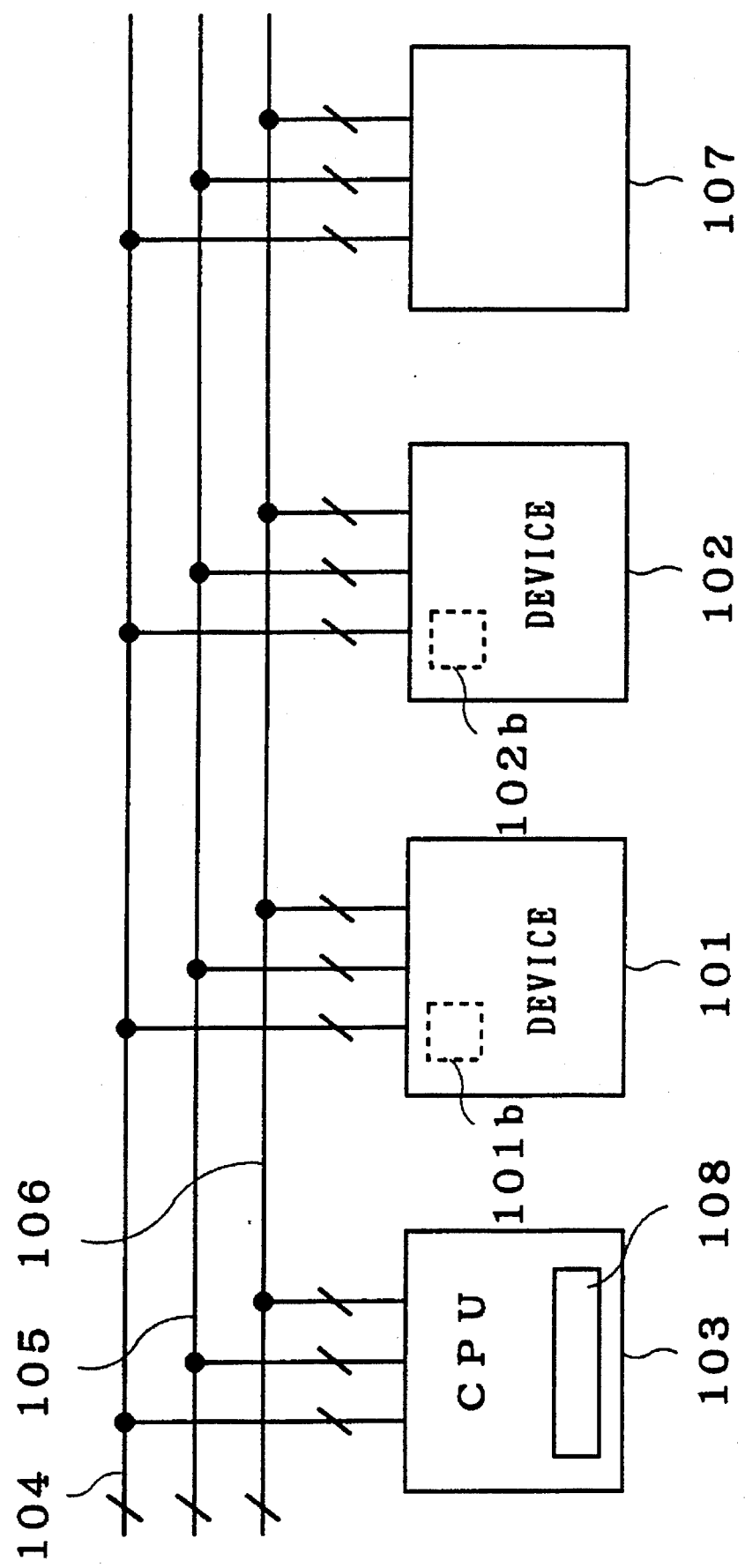
FIG. 1 is a block diagram schematically showing a failure detection system of the present invention.

A failure detection system in accordance with the first preferred embodiment of the present invention will be described referring to figures. FIG. 1 is a block diagram showing a configuration of an apparatus in which the failure detection system of the present invention is employed. In FIG. 1, reference numerals 101 and 102 denote devices including different integrated circuits, and numeral 103 denotes a CPU for controlling the devices 101 and 102. Reference numeral 104 denotes a control signal bus for transmitting control signals, such as read/write signal, chip enable signal and self-test enable signal, between the devices 101 and 102 and the CPU 103. Reference numeral 105 denotes a data signal bus for transmitting data signals between the devices 101 and 102 and the CPU 103, and numeral 106 denotes an address signal bus for transmitting address signals between the devices 101 and 102 and the CPU 103. Reference numeral 107 denotes a memory provided outside the CPU 103 and connected to the CPU 103 and the devices 101 and 102 by the data signal bus 105 and the like for storing data processed in the CPU 103 and the like and numeral 108 denotes a memory provided within the CPU 103 for storing data processed in the CPU 103.

In the apparatus of FIG. 1, the devices 101 and 102 comprises failure detection circuits 101b and 102b, respectively, for detecting failure of the respective integrated circuits incorporated in the devices 101 and 102. The CPU 103 performs control operations associated with read/write, self-test or the like through the control signal bus 104, the data signal bus 105 and the address signal bus 106. The devices 101 and 102 are capable of performing an error check of the integrated circuits by conducting a self-test using the failure detection circuits 101b and 102b incorporated therein.

Figure 2:
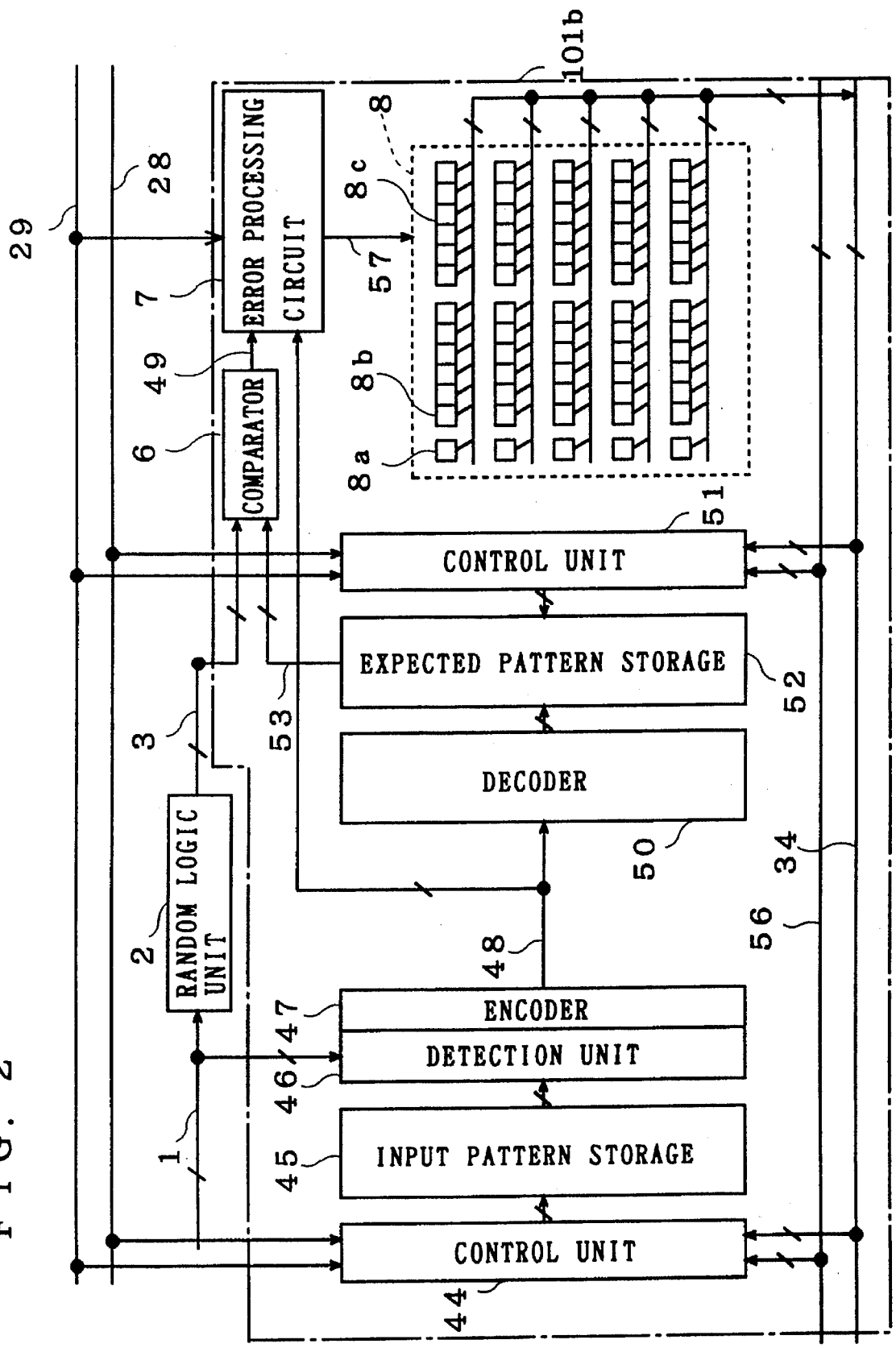
FIG. 2 is a block diagram showing a configuration of a failure detection circuit in accordance with a first preferred embodiment of the present invention.

FIG. 2 is a block diagram showing a configuration of the failure detection circuit in accordance with the first preferred embodiment of the present invention. In FIG. 2, reference numeral 44 denotes a control unit connected to a data bus 34 and a control bus 56 for controlling an input pattern inputted from the outside of the integrated circuit and numeral 45 denotes an input pattern storage controlled by the control unit 44 for storing the input pattern. Reference numeral 46 denotes a detection unit connected to the input pattern storage 45 and an input signal conductor 1, for detecting whether input data delivered to a random logic unit 2 through the input signal conductor 1 and the input pattern stored in the input pattern storage 45 are in agreement or not. Reference numeral 47 denotes an encoder for generating a code representing the address of the input pattern storage 45 which stores the input pattern being in agreement with the input data and numeral 48 denotes an output line for outputting the data encoded by the encoder 47.

Reference numeral 50 denotes a decoder for receiving the encoded data outputted from the encoder 47 and decoding it to generate data representing the address of the input pattern storage 45 which stores the input pattern being in agreement with the input data. Reference numeral 51 denotes a control unit connected to the data bus 34 and the control bus 56 for controlling an expected pattern inputted from the outside of the integrated circuit, reference numeral 52 denotes an expected pattern storage controlled by the control unit 51 for storing the expected pattern and numeral 53 denotes an output signal conductor for outputting the expected pattern which is selected. Reference numeral 6 denotes a comparator connected to an output signal conductor 3 and the output signal conductor 53, for comparing output data of the random logic unit 2 with the expected pattern outputted from the expected pattern storage 52 to output a comparison result indicating whether or not the output data and the expected pattern are in agreement to a signal conductor 49. The signal conductor 49 transmits the comparison result of the comparator 6. Reference numeral 7 denotes an error processing circuit for writing various information, such as the occurrence of error and which input/output pattern and which functional block concern the error, into an error flag field 8a, a pattern number field 8b and a block number field 8c within an error register 8 when it receives a notification that the error occurs through the signal conductor 49.

Next, the operation of the failure detection circuit 101b will be described. The random logic unit 2 which is an object of failure detection is included within the integrated circuit, and it processes the input data applied through the input signal conductor 1 and outputs a processed result to the output signal conductor 3. For simplification of description, it is assumed herein that the output data of the random logic unit 2 is uniquely determined depending on the input data.

In an initial stage (when it is reset), the integrated circuit is set in non-selftest mode with the error register 8 cleared and the error processing circuit 7 inactivated.

Next, the CPU 103 writes the input pattern to be tested into the input pattern storage 45 through the control bus 56 and the data bus 34. The expected pattern corresponding to the input pattern stored in the input pattern storage 45 is written in the expected pattern storage 52 at the address corresponding to that of the input pattern storage 45. Then, the CPU 103 sets the error processing circuit 7 in an enable state, thereby ensuring self-test mode.

When the random logic unit 2 receives the input data through the input signal conductor 1, the detection unit 46 compares one by one the input data applied to the random logic unit 2 with the input pattern stored in the input pattern storage 45. When the input data and the input pattern stored in the input pattern storage 45 are in agreement, the detection unit 46 outputs information of the address of the input pattern storage 45 which stores the input pattern being in agreement to the encoder 47. The encoder 47 encodes the information to output the code of the information to the signal conductor 48.

When the input pattern is not in agreement with the input data, the detection unit 46 outputs, e.g., a signal consisting of zero only to the encoder 47. In this case, the encoder 47 gives a notification that the input data and the input pattern are in disagreement through the signal conductor 48 to the decoder 50 and the error processing circuit 7. The error processing circuit 7 performs no operation on the output of the comparator 6.

The decoder 50 decodes the code including the information as to whether agreement or disagreement and the code representing the address of the input pattern storage 45 which stores the input pattern through the signal conductor 48 and selectively outputs the expected pattern of the expected pattern storage 52 having the address. One of a plurality of expected patterns stored in the expected pattern storage 52 is thereby selected, and the expected pattern is outputted through the output signal conductor 53 to the comparator 6. The comparator 6 compares the output signal from the random logic unit 2 with the expected pattern outputted from the expected pattern storage 52, and outputs the comparison result indicating whether agreement or disagreement to the signal conductor 49. The outputted comparison result indicating whether agreement or disagreement, which shows whether or not the random logic unit 2 perform a normal operation, is inputted to the error processing circuit 7 through signal conductor 49.

When the self-test enable signal is at high level, if an error is detected, the error processing circuit 7 gives a notification that the error is found to the outside and sets the code representing the occurrence of error, which address of the input pattern storage 45 the input pattern concerning the detected error is stored at and which functional block concerns the detected error into the error flag field 8a, a pattern number field 8b and a block number field 8c in the error register 8. The outside CPU 103 shown in FIG. 1 thereby finds which functional block in the integrated circuit and which input pattern concern the detected error, thus obtaining statistical information concerning the occurrence of error on real time.

Figure 6:
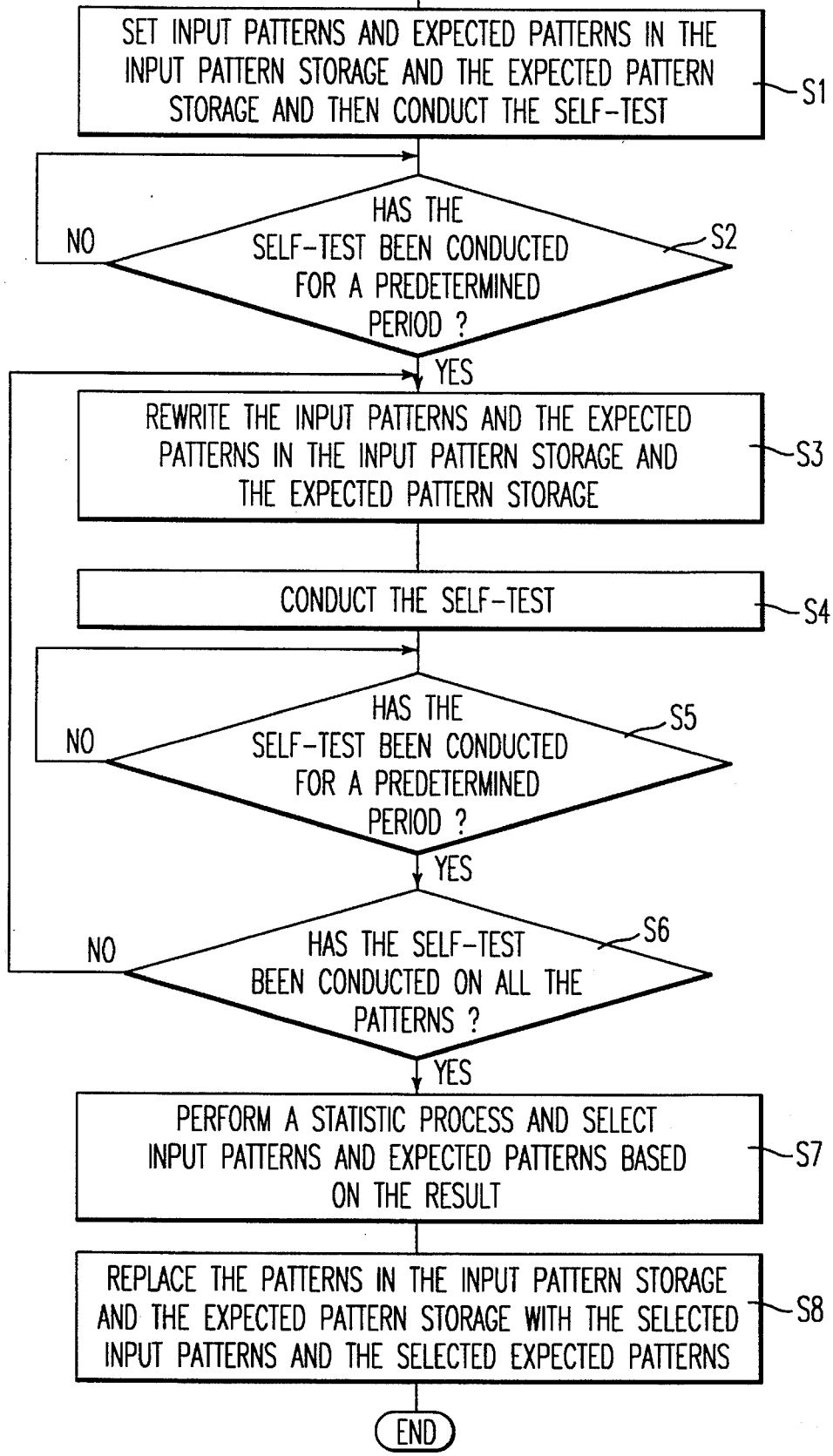
FIG. 6 is a flow chart showing an operation of the failure detection system in accordance with the first preferred embodiment of the present invention.

FIG. 6 is a flow chart showing an exemplary operation of the failure detection system to obtain the statistical information. The number of input patterns which have possibility for error and the number of expected patterns corresponding thereto are generally larger than that of input patterns to be stored in the input pattern storage 45 and that of expected patterns to be stored in the expected pattern storage 52, respectively. In the failure detection system in accordance with the first preferred embodiment is also capable of obtaining the statistical information while processing signals. However, it is preferable in the failure detection system that the input patterns and the expected patterns to be stored in the input pattern storage 45 and expected pattern storage 52 should be determined after carrying out a self-test on all the patterns inputted to the functional block within the integrated circuit by changing the patterns to be tested periodically, to obtain the statistical information concerning the occurrence of error on all the possible patterns.

First, in Step S1, input patterns and expected patterns are set in the input pattern storage 45 and the expected pattern storage 52, respectively, and then the self-test is conducted, monitoring the conditions of the occurrence of error. After a predetermined period for the self-test is elapsed (Step S2), the input patterns of the input pattern storage 45 and the expected pattern of the expected pattern storage 52 are rewritten (Step S3).

After rewriting, the self-test is conducted, monitoring the conditions of the occurrence of error for the predetermined period (Steps S4, S5). Repeating these steps (Steps S3 to S5), when judgment is made that the self-test has been conducted on all the input patterns and expected patterns for a predetermined period is made (Step S6), the statistical result of the self-test is made in Step S7, and then the input patterns and the expected patterns to be tested are selected based on the statistical result. For example, a pattern of highest frequency of error during the predetermined period may be selected.

The input patterns stored in the input pattern storage 45 and the expected patterns stored in the expected pattern storage 52 are replaced with the selected input patterns and the selected expected patterns, respectively (Step S8).

Through the steps as above, the failure detection system achieves such failure detection as a self-test of high detection ratio of error can be conducted with a small-scale failure detection circuit by setting the input patterns and the expected patterns of high probability of error in the input pattern storage 45 and the expected pattern storage 52.

Figure 3:
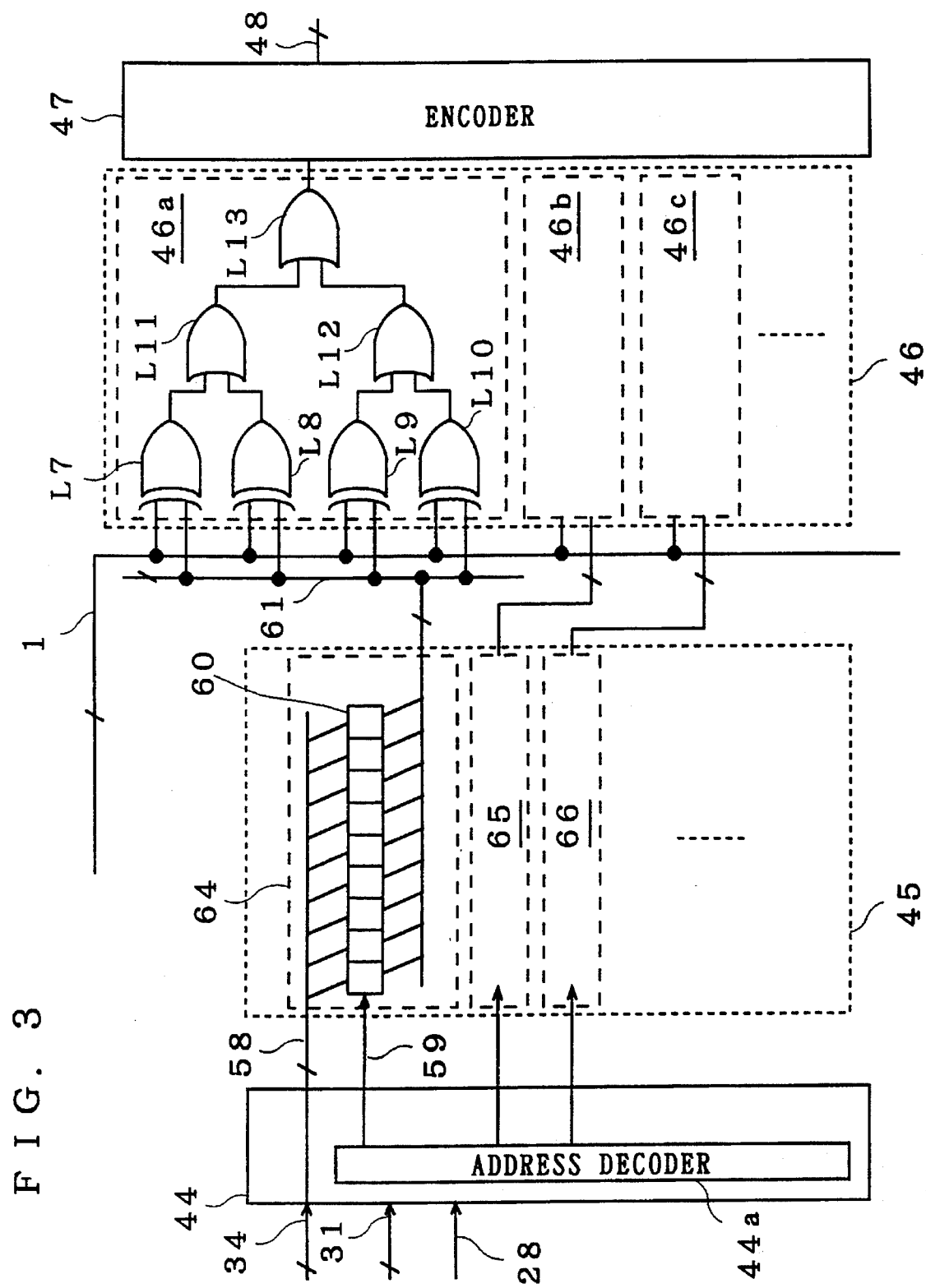
FIG. 3 is a view illustrating in detail a control trait, an input pattern storage and a detection unit of the failure detection system in accordance with the first preferred embodiment of the present invention.

FIG. 3 is a block diagram illustrating in detail the configuration of the control unit 44, the input pattern storage 45 and the detection unit 46 of FIG. 2. In FIG. 3, reference numeral 44a denotes an address decoder provided in the control unit 44 for decoding an address signal inputted through the control bus 56 to select the input pattern stored in the input pattern storage 45. The enable signal which enables writing/reading operation for the input pattern storage 45 is inputted to the address decoder 44a through the signal conductor 28.

Reference numeral 60 denotes a set of input pattern storing registers for storing an input pattern. The input pattern storage 45 comprises a plurality of sets of input pattern storing registers 60. In each address 64 to 66, a set of input patten storing registers 60 are disposed, being connected to an output bus 61 and a bus 58 which is connected to the data bus 34. When the enable signal inputted to the address decoder 44a is in an enable state, one of the addresses 64 to 66 each having a set of input pattern storing registers 60 is selected. The data inputted to the data bus 34 are transmitted through the bus 58 to be written into the input pattern storing registers 60 having the selected address.

Reference numerals 46a to 46c denote comparison circuits provided in the detection unit 46, for comparing the input patterns stored at the addresses 64 to 66 respectively in the input pattern storage 45 with the input data inputted through the input signal conductor 1. Although only three comparison circuits are shown herein, the number of comparison circuits corresponds to the number of bits of the input signal. Each of the comparison circuits 46a to 46c comprises exclusive OR gates (hereinafter referred to as "EXOR gate") L7 to L10 each having two inputs for receiving each bit of the input data applied through the input signal conductor 1 by one input and receiving each bit of the input pattern applied through the output bus 61 by the other input. In order to take a logical sum of all the outputs of L7 to L10, the outputs of the EXOR gates L7 and L8 are connected to the respective inputs of a two-input OR gate L11 and the outputs of the EXOR gates L9 and L10 are connected to the respective inputs of a two-input OR gate L12, and further the outputs of the EXOR gates L11 and L12 are connected to the respective inputs of a two-input OR gate L13.

The input pattern in the input pattern storing registers 60 is inputted to the comparison circuits 46a to 46c and the like through the output bus 61. The comparison circuits 46a to 46c and the like compare one by one the input data from the input signal conductor 1 with the input pattern from the input pattern storing registers 60, and notify the encoder 47 of whether agreement or disagreement. According to the comparison result of the comparison circuits, the encoder 47 generates a number representing the register which stores the input pattern being in agreement with the input data to output the number to the signal conductor 48.

Figure 4:
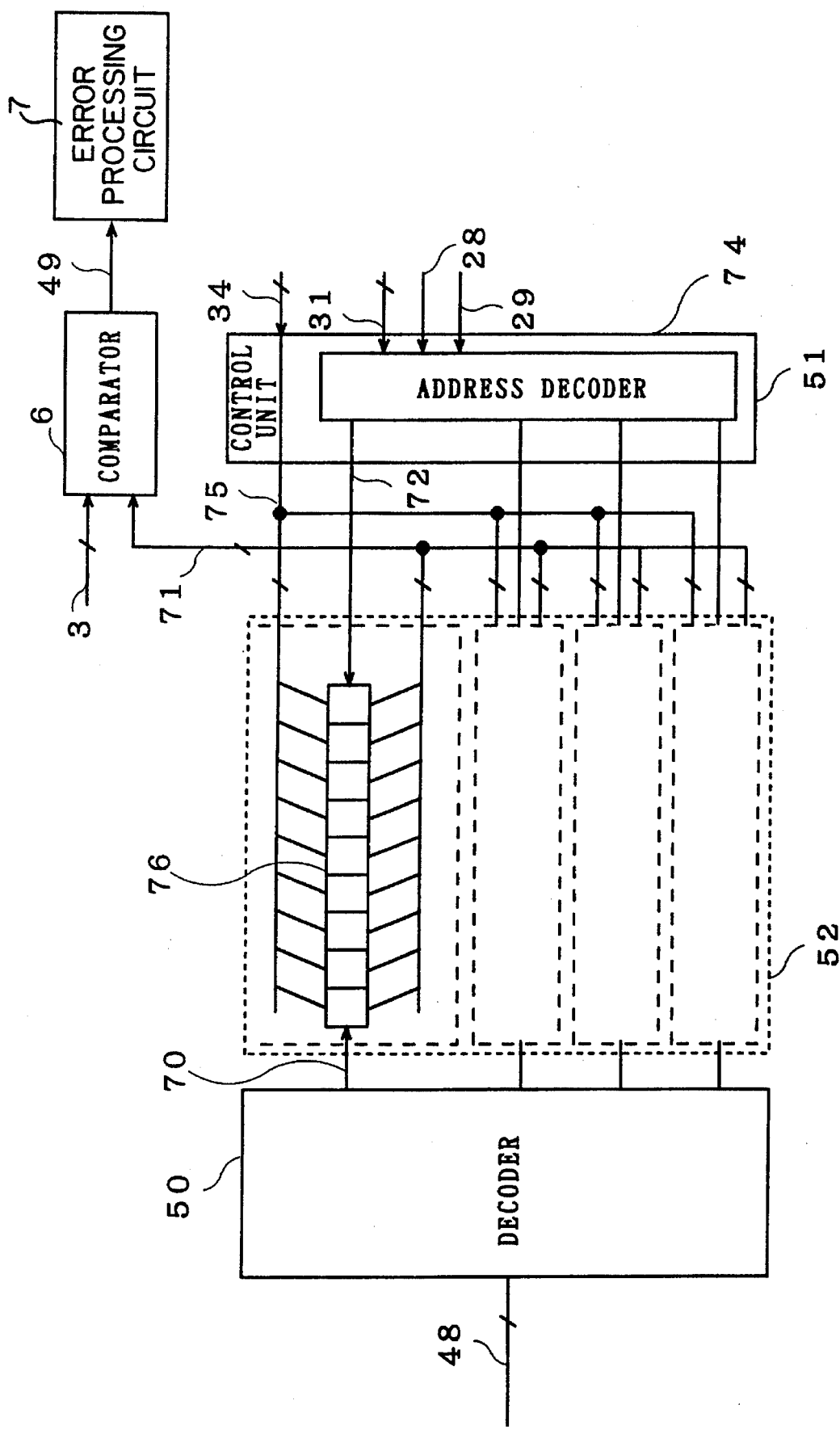
FIG. 4 is a view illustrating in detail a control unit and an expected pattern storage of the failure detection system in accordance with the first preferred embodiment of the present invention.

FIG. 4 is a block diagram illustrating in detail the control unit 51 and the expected pattern storage 52 of FIG. 2. In FIG. 4, reference numeral 76 denotes a set of expected pattern storing registers for storing an expected pattern corresponding to an input pattern. The control unit 51 controls writing/reading operation for the expected pattern storing register 76. The signal conductor 28 for transmitting the enable signal to cause an enable state of writing/reading operation for the expected pattern storage 52, the signal conductor 29 for transmitting the self-test enable signal and the address signal bus 31 for transmitting the address signal representing the address of the set of expected pattern storing registers 76 are connected to an address decoder 74. When the enable signal is in an enable state, the address decoder 74 selects a set of the expected pattern storing registers 76 according to the address signal inputted through the address signal bus 31.

The data inputted to the data bus 34 are transmitted through the bus 75 to be written into the expected pattern storing register 76. Reference numeral 71 denotes an output bus for output the expected pattern from the expected pattern storing register 76 and transmits the expected pattern to the comparator 6. The comparator 6 compares the output data of the random logic unit 2 with the expected pattern which is selected, judging whether they are in agreement or disagreement, and outputs the comparison result.

Figure 5:
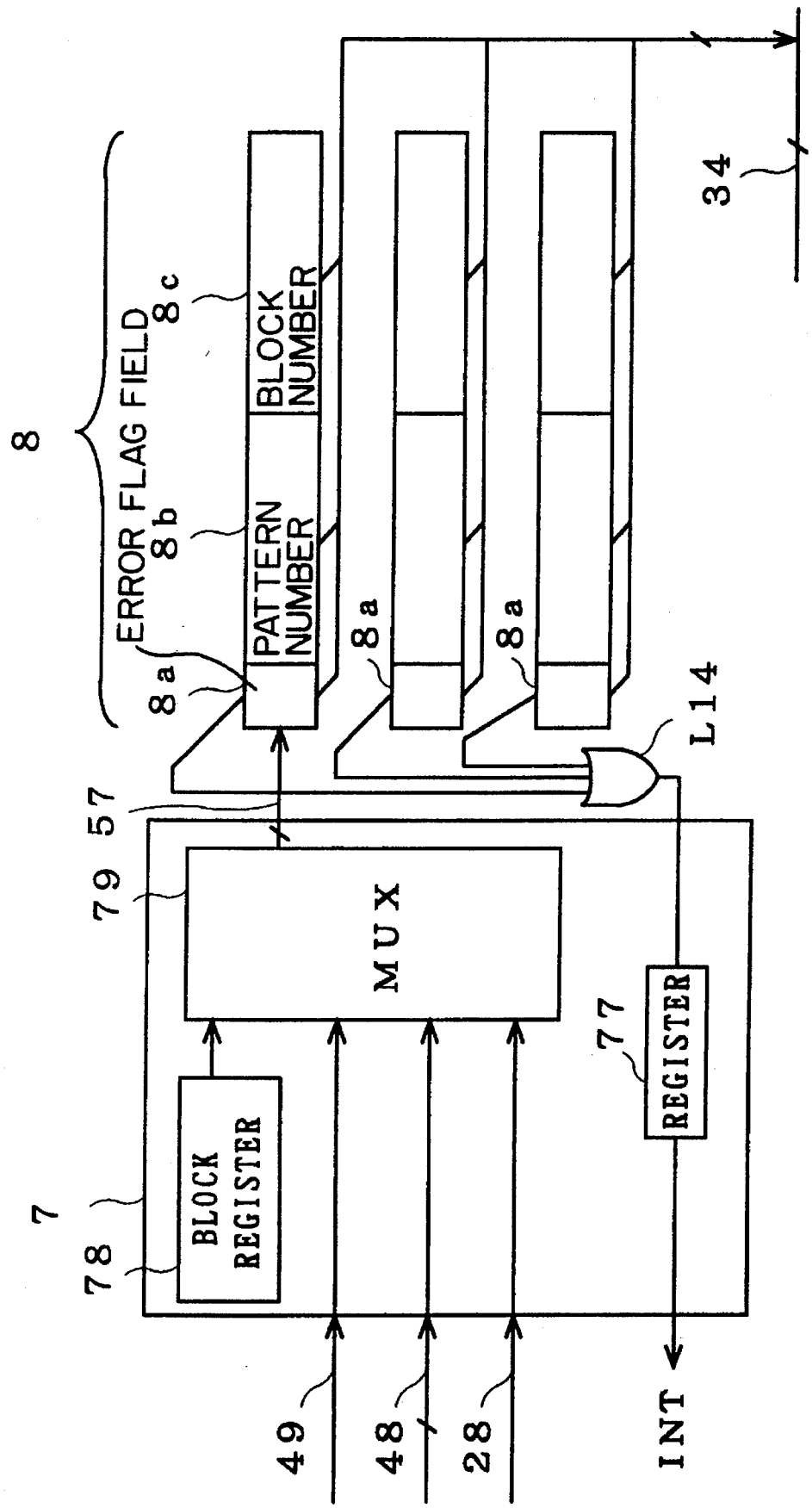
FIG. 5 is a view illustrating in detail an error processing circuit of the failure detection system in accordance with the first preferred embodiment of the present invention.

FIG. 5 is a more detailed block diagram showing the error processing circuit 7 and the error register 8 of FIG. 2. Reference numeral 78 denotes a block register which stores a number in a one-to-one correspondence with the random logic unit to be tested among a plurality of random logic units. Reference numeral 79 a multiplexer connected to the block register 78, for receiving the output from the block register 78, a judgment signal from the comparator 6, an output from the encoder 48 inputted one by one in response to the processing of the random logic unit 2 of FIG. 2 and combining these signals to be outputted. Receiving the enable signal through the signal conductor 28, the multiplexer 79 is brought into an enable state when the enable signal is at high level.

The error processing circuit 7 comprises the block register 78 and the multiplexer 79. When the judgment result of the comparator 6 indicates error and the enable signal controlled by the outside is in an enable state, the error processing circuit 7 combines an error flag indicating whether the error occurs or not, a block number designating which functional block concerns the error and a pattern number designating which pattern concerns the error to be outputted to the bus 57.

The result outputted from the error processing circuit 7 is inputted to the error register 8. In the error register 8, the error flag, the pattern number and the block number are written into the error flag field 8a, the pattern number field 8b and the block number field 8c, respectively. Since there are a plurality of functional blocks, the error registers 8 comprises a plurality of groups of the error flag fields 8a, the pattern number fields 8b and block number fields 8c.

The data from a plurality of error flag fields 8a are inputted to an OR gate L14, and the logical sum thereof is outputted to a register 77. The register 77 stores data concerning an interrupt signal INT. When any of the error flag fields 8a has an error flag which is set on, a notification that the error occurs is delivered through the OR gate L14 and then the register 77 outputs the interrupt signal INT.

Thus, the CPU 103 of FIG. 1 monitors the error register 8 at any time. Or, when the occurrence of error is notified by the interrupt signal INT which is provided so as to give a notification of the occurrence of error to the outside, it is found which functional block and which pattern stored in the input pattern storage 45 concern the error by studying the content of the error register 8. Therefore, it is possible to obtain the information regarding the error on each occasion and the possibility of the occurrence of error by input pattern. Moreover, even a hard ware having a small number of test circuits can achieve efficient and dynamic failure detection of high detection ratio by reprogramming of the failure detection circuit 101a so that a self-test may be conducted preferentially for input patterns with high possibility of error.

Figure 7:
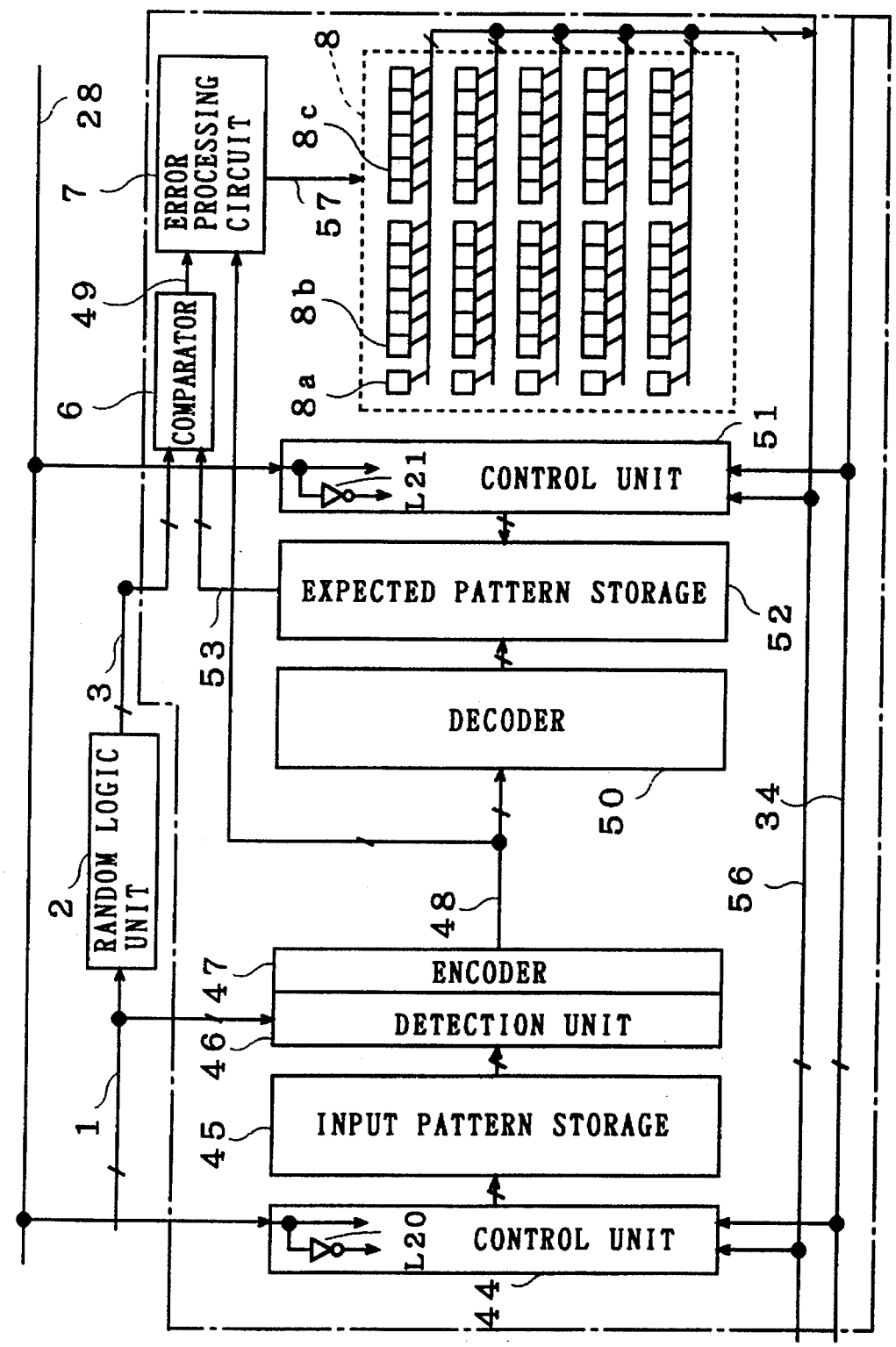
FIG. 7 is a block diagram showing another configuration of the failure detection circuit in accordance with the first preferred embodiment of the present invention.

As shown in FIG. 7, there may be an arrangement where an inverted version of the enable signal transmitted through the signal conductor 28 is employed instead of the self-test enable signal, thereby reducing the number of input pins to the integrated circuit. Furthermore, in FIG. 7, L20 and L21 denotes invertor for inputting the inverted logic of the enable signal to the control units 44 and 51, respectively.

In the first preferred embodiment, it is shown that it is possible to detect whether or not the functional block within the integrated circuit performs a normal operation by conducting the self-test while the integrated circuit is in operation or is not used by the apparatus. However, the failure detection system in accordance with the first preferred embodiment and the conventional failure detection system ensure proper failure detection only under the condition that the failure detection circuit is not out of order. Therefore, reliability on the failure detection system can be enhanced by verifying that the failure detection system can carry out proper detection of the occurrence of error through comparison between the processed result of the random logic and an expected value which is intentionally wrong in the failure detection circuit.

Figure 8:
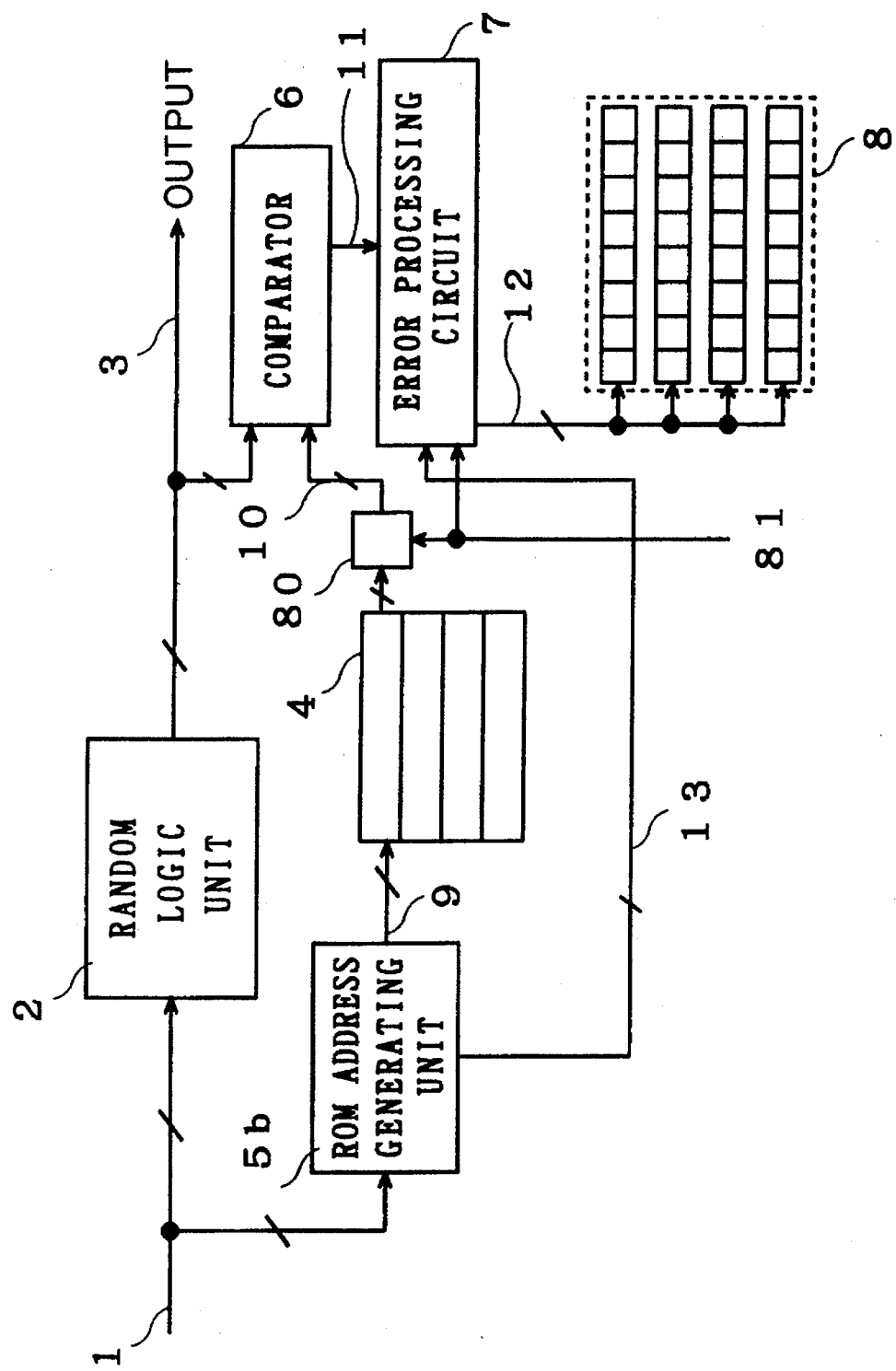
FIG. 8 is a block diagram showing a configuration of a failure detection circuit in accordance with a second preferred embodiment of the present invention.

A failure detection system in accordance with the second preferred embodiment of the present invention will be described referring to FIG. 8. FIG. 8 is a block diagram showing a part of the failure detection system in accordance with the second preferred embodiment which comprises a circuit for making a judgment as to whether or not the failure detection system performs a normal operation.

Figure 15:
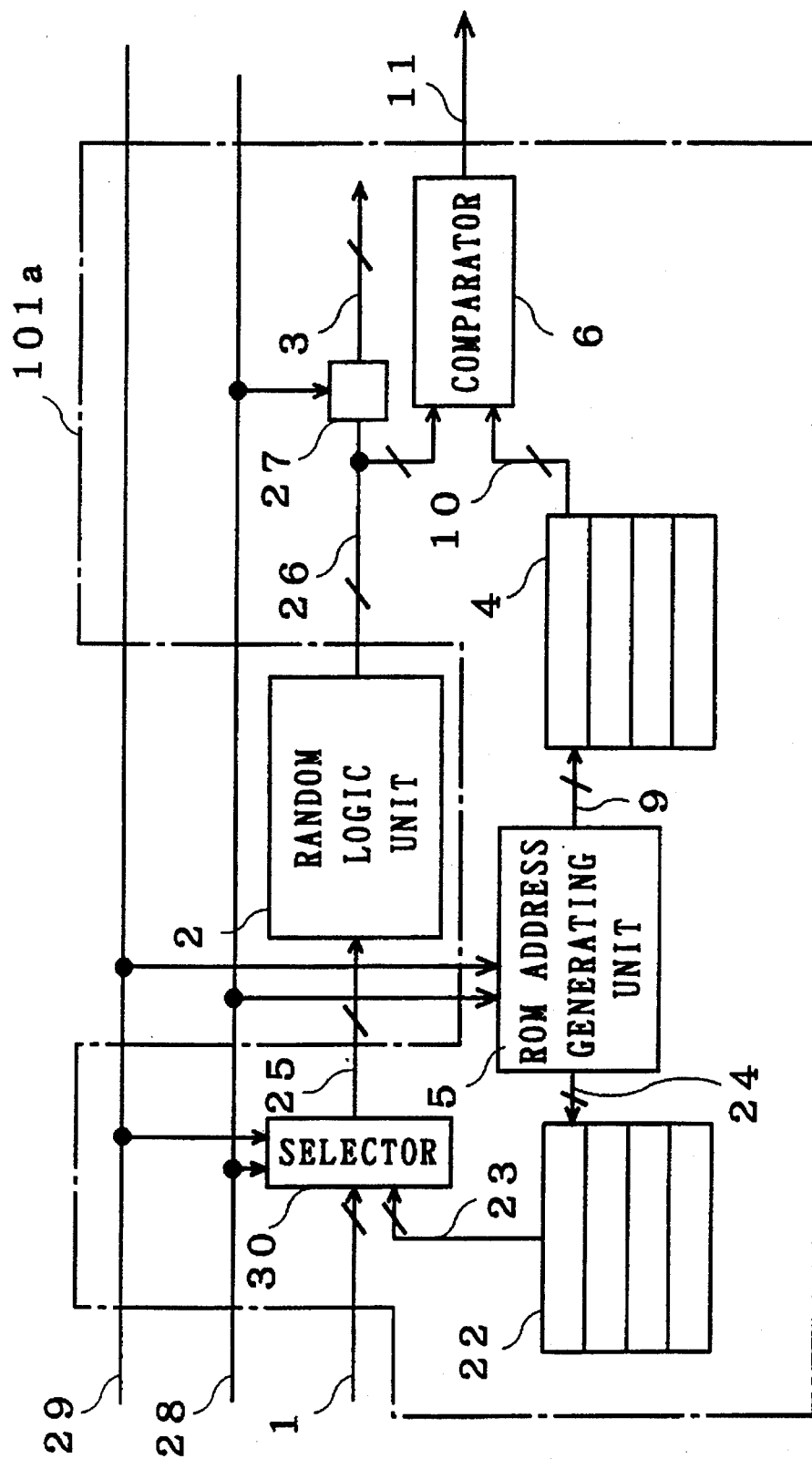
FIG. 15 is a block diagram showing a configuration of a conventional failure detection circuit.
Figure 16:
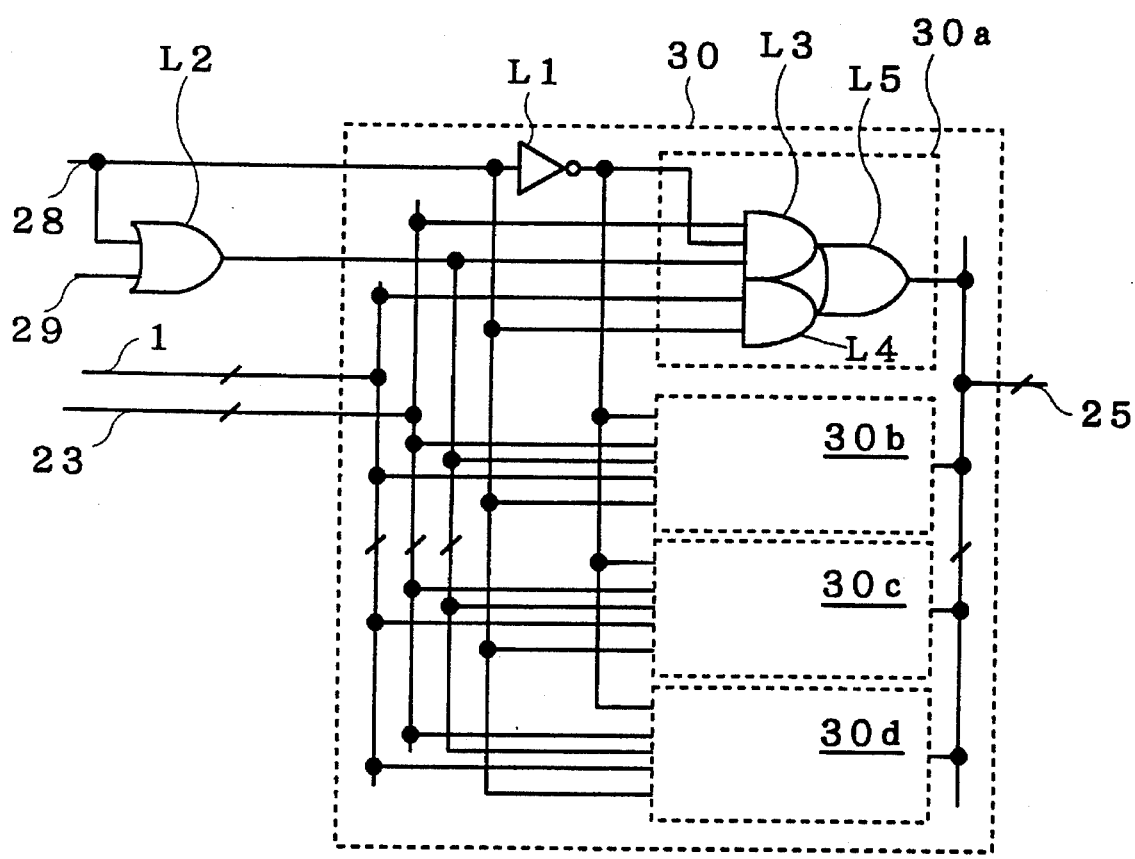
FIG. 16 is a logic circuit diagram showing a configuration of a selector in the conventional failure detection circuit.
Figure 17:
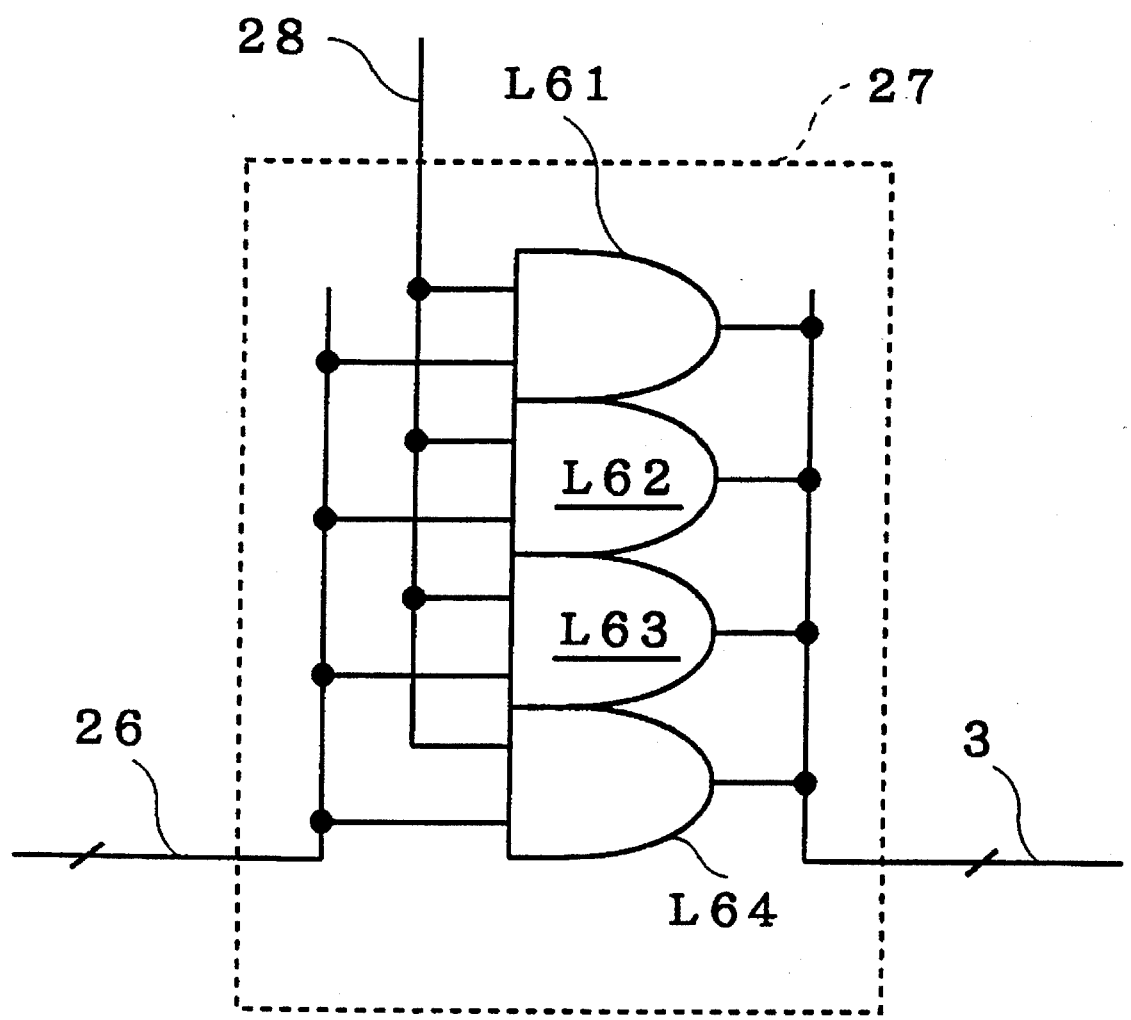
FIG. 17 is a logic circuit diagram showing a configuration of a switch in the conventional failure detection circuit.

In FIG. 8, like reference numerals identical to those in the failure detection circuit in accordance with the first preferred embodiment in FIG. 2 and the conventional failure detection circuit in FIG. 15 denote functions identical or corresponding to those in FIG. 2 and FIG. 15. Reference numeral 81 denotes a signal conductor for making a choice whether or not to apply an expected value which is intentionally wrong in order to test whether or not the self-test circuit conducts a normal failure detection. When the signal conductor 81 is at high level, the output from the test comparison ROM 4 is transmitted, passing through a malfunction verification block 80, to the comparator 6, thereby verifying a normal operation of the random logic unit 2.

When the signal conductor 81 is at low level, the output from the test comparison ROM 4 is inverted by the malfunction verification block 80 and then transmitted to the comparator 6. In this case, since a wrong expected value is always given, an error should be detected if the self-test is properly conducted. The error processing circuit 7 are expected to notify a comparator error judged from the combination of the comparison result of the comparator 6 and the signal inputted through the signal conductor 81. If the comparator 6 does not notify the error on this occasion and in a normal test mode, the error processing circuit 7 judges that the random logic unit 2 or the failure detection circuit has malfunction, to set an error flag in the error register 8 and write a code indicating the possibility that the self-test may be out of order to error register 8. Furthermore, the occurrence of error may be notified to the outside CPU 103 of FIG. 1 by using the interrupt signal INT.

Figure 9:
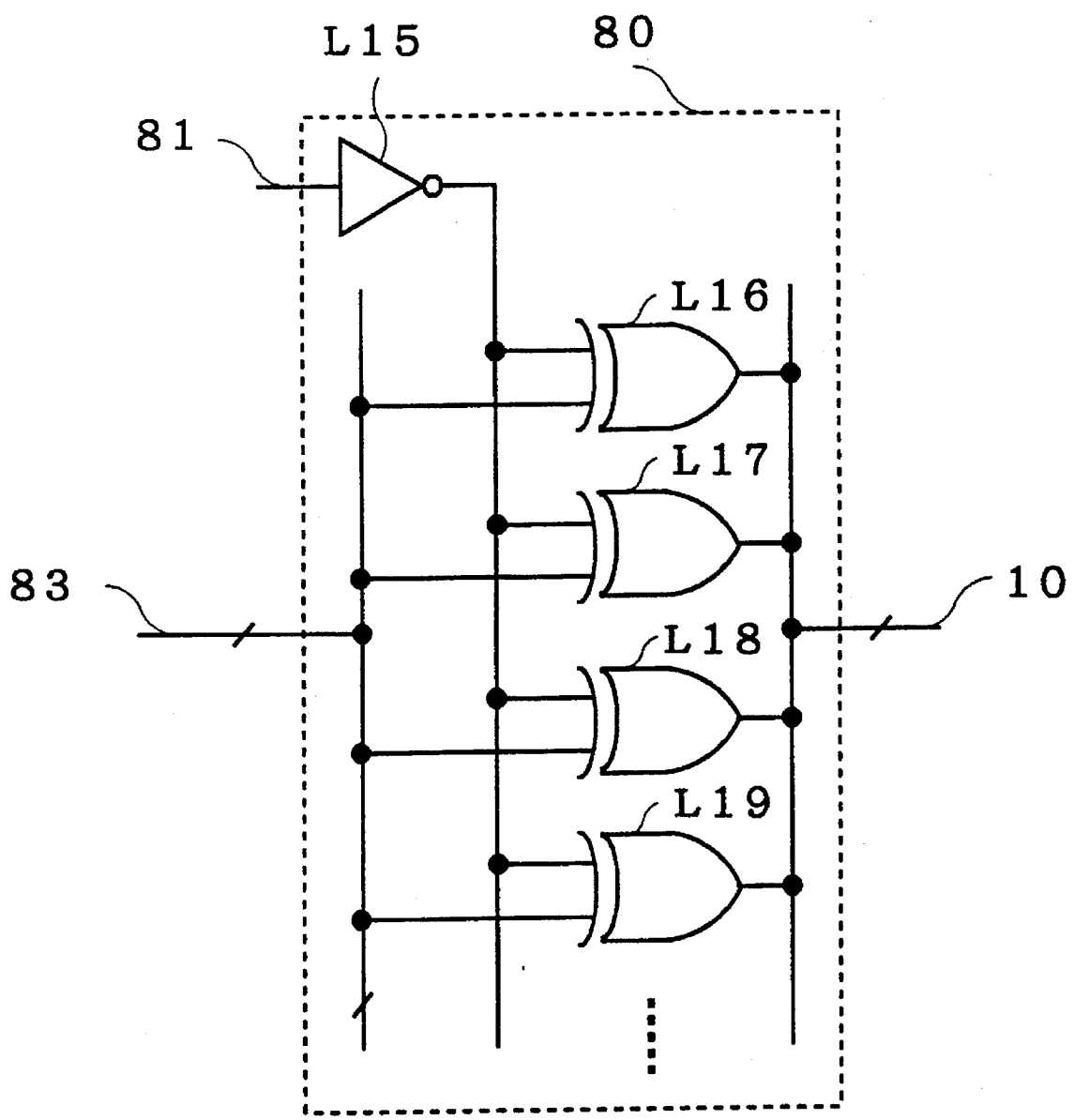
FIG. 9 is a logic circuit diagram showing a configuration of a malfunction verification block in accordance with the second preferred embodiment of the present invention.

FIG. 9 is a block diagram showing an exemplary configuration of the malfunction verification block 80 of FIG. 8. Reference numeral L15 denotes an invertor having an input connected to the signal conductor 81 for outputting the inverted logic of the signal transmitted through the signal conductor 81. Reference numeral 10 denotes a signal conductor for delivering the output of the malfunction verification block 80 connected to the comparator 6. L16 to L19 denote EXOR gates each having an input for receiving the output from the test comparison ROM 4 through a signal conductor 83 and another input for receiving the output from the invertor L15. The number of the EXOR gates is equal to that of bits of the signal applied through the signal conductor 83. When the signal conductor 81 is at low level, the signal of the signal conductor 83 is inverted to be outputted to the signal conductor 10. When the signal conductor 81 is at high level, the output from the test comparison ROM 4 is outputted to the signal conductor 10 without being inverted.

A failure detection system in accordance with the third preferred embodiment will be described referring FIG. 10. In the test comparison ROM 4 of the second preferred embodiment, there may be a case where the processed results of the random logic unit 2 in response to some data prepared for the self-test or some input data have the same value. In other words, there may be a plural-to-one correspondence of the input pattern and the expected pattern responsive thereto. In this case, a plurality of expected patterns of the same value in the test comparison ROM 4 can be cut all but one. Reduction in the amount of data can be thereby achieved.

Figure 10:
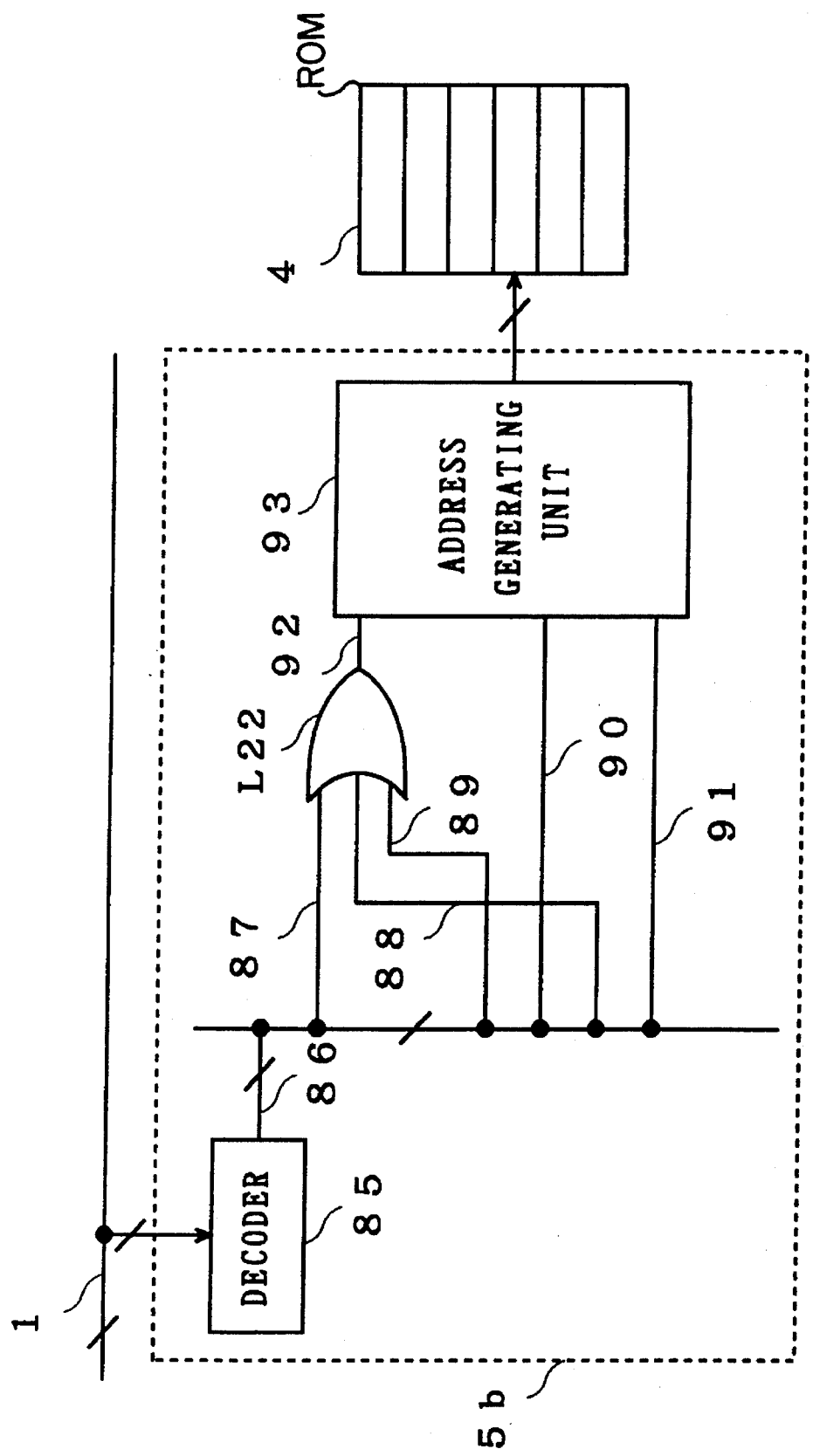
FIG. 10 is a block diagram showing a configuration of a ROM address generating unit in accordance with a third preferred embodiment of the present invention.

In FIG. 10, reference numeral 1 denotes the input signal conductor, 4 denotes the test comparison ROM storing expected patterns, 5b denotes a ROM address generating unit for outputting an address signal indicating the address of the test comparison ROM 4 corresponding to the signal inputted through the input signal conductor 1. Reference numeral 85 denotes a decoder for receiving data inputted through the input signal conductor 1 and selecting one among the signal conductors 86 in response to the input data to make it high level. An output of the decoder is uniquely determined depending on the input pattern, and the output and the input pattern have a one-to-one correspondence. Reference numerals 87 to 89 denote a group of signals which correspond to the same expected value among the outputs from the decoder 85. Reference numerals 90 and 91 denotes signals which correspond to different expected values. The signals 87 to 89 are inputted to an OR gate 92, and when any of these signals is at high level, a signal of high level is outputted to a signal conductor 92. Reference numeral 93 denotes an address generating unit for outputting an address signal designating one of the addresses of the test comparison ROM 4 in response to the signal conductors 92, 90 and 91.

Thus, by making an arrangement so that only one expected value is prepared for the input patterns which correspond to the same expected value, reduction in the amount of data in the test comparison ROM 4 which stores expected patterns and reduction in the number of transistors in the failure detection circuit as well can be achieved.

Figure 11:
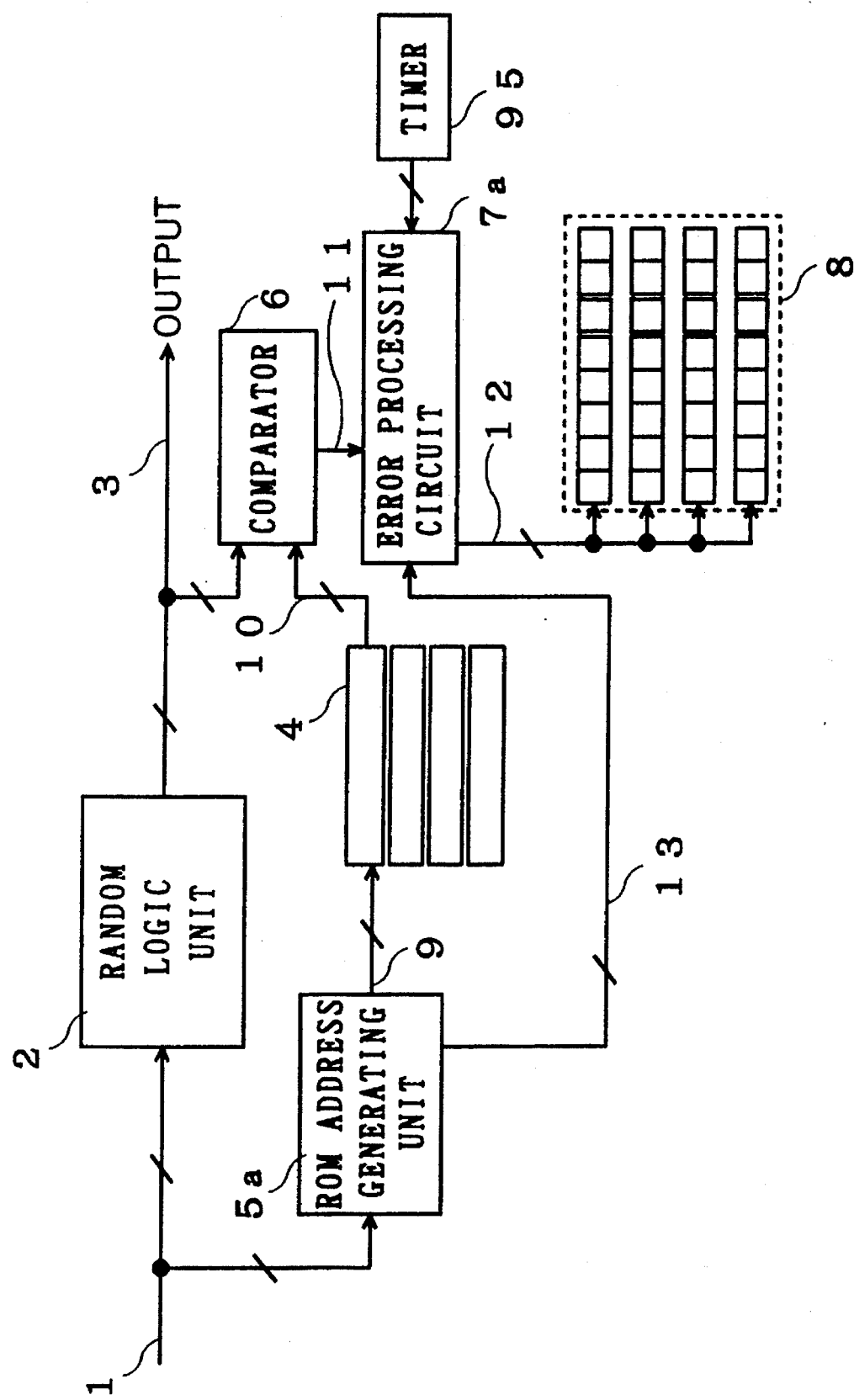
FIG. 11 is a block diagram showing a configuration of a failure detection circuit in accordance with a fourth preferred embodiment of the present invention.

A failure detection system in accordance with the fourth preferred embodiment of the present invention will be described referring to FIG. 11. FIG. 11 is a block diagram of the failure detection system in accordance with the fourth preferred embodiment of the present invention. In FIG. 11, like reference numerals identical to those in the failure detection circuit in accordance with the first preferred embodiment in FIG. 2 and the conventional failure detection circuit in FIG. 15 denote functions identical or corresponding to those in FIG. 2 and FIG. 15. Reference numeral 5a denotes a ROM address generating unit for receiving the input signal through the input signal conductor 1 and generating an address signal indicating the address of the test comparison ROM 4 corresponding to the input signal to be outputted. Reference numeral 95 denotes a timer provided within the integrated circuit, for holding a value representing the present time of the system. The timer 95 is connected to the error processing circuit 7a to communicate thereto the present time.

Figure 12:
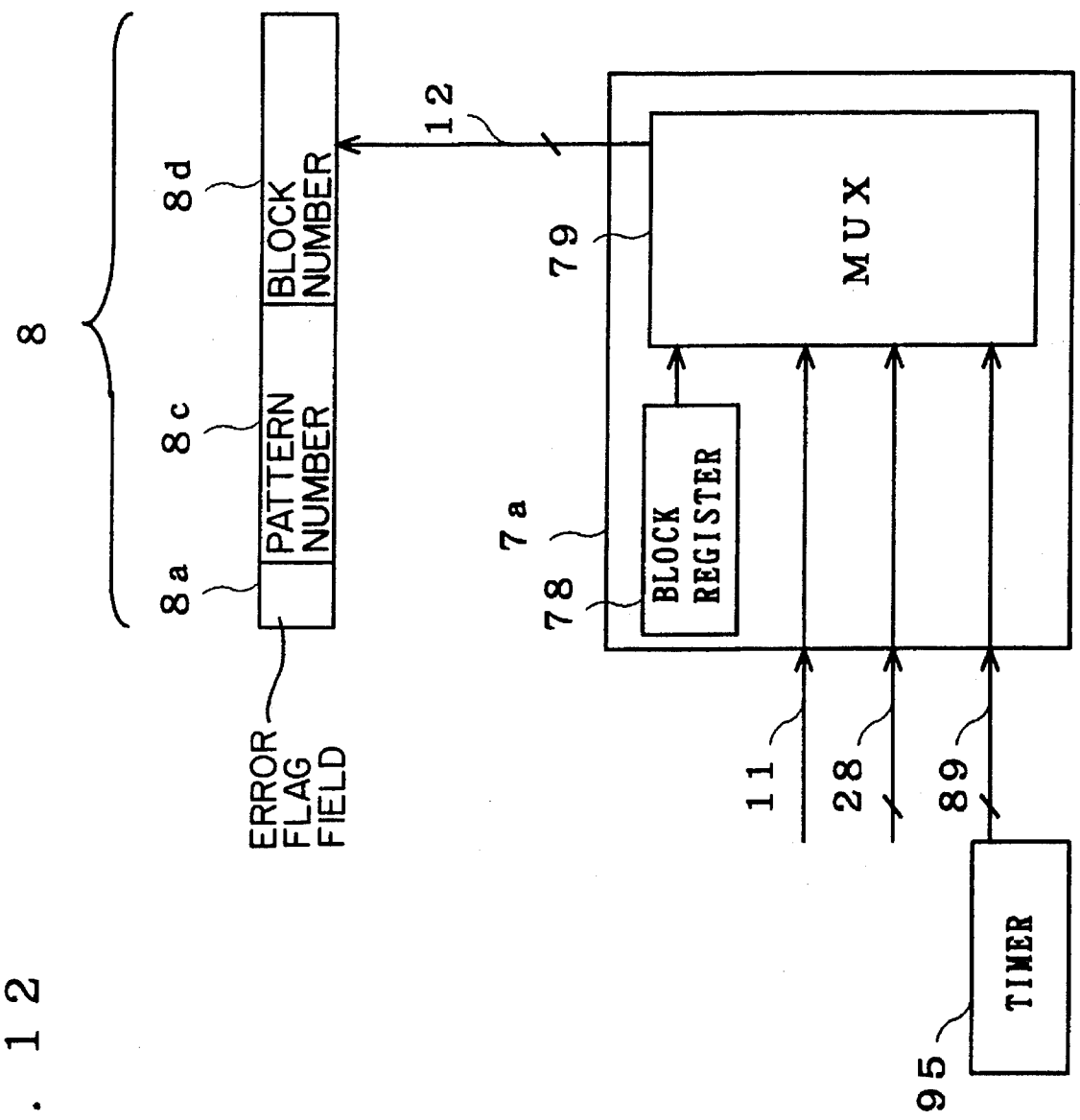
FIG. 12 is a block diagram showing a configuration of a error processing circuit in accordance with the fourth preferred embodiment of the present invention.
Figure 14:
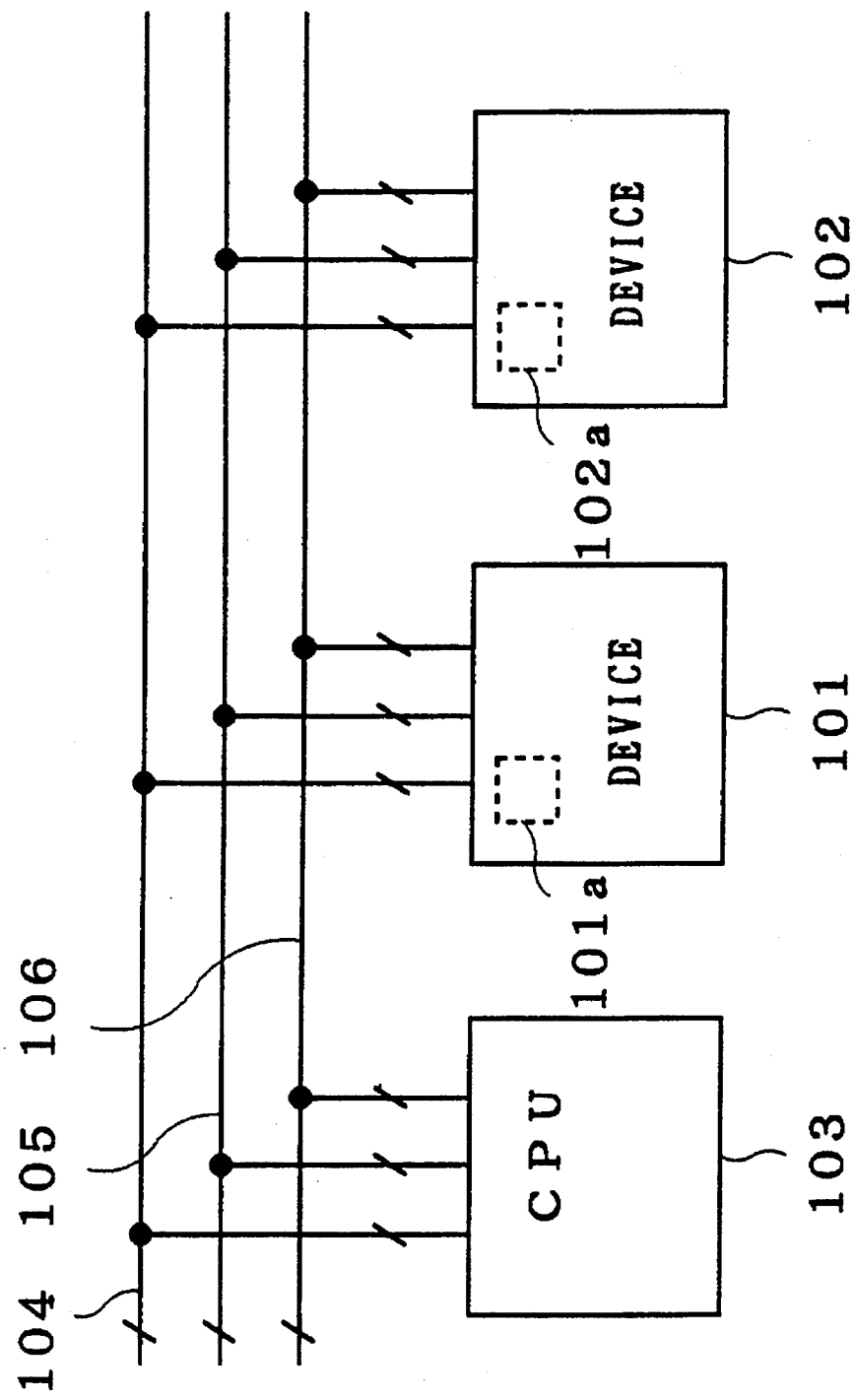
FIG. 14 is a block diagram showing a configuration of a conventional failure detection system.

FIG. 12 is a more detailed block diagram of the error processing circuit 7a and the error register 8 of FIG. 11. When the error processing circuit 7a receives the judgment signal which represents the judgment result of error given by the comparator 6 and an output signal 89 of the timer 95 (indicating the present time), the error processing circuit 7a multiplexes the error flag, a number indicating the block register 78 which stores a unique number to the random logic unit 2 to be tested and the output signal 89 from the timer 95 to be outputted to a bus 12. The result outputted therefrom is inputted to the error register 8, and then an error flag indicating whether or not an error exists, a block number designating which functional block concerns the error and a code representing the time when the error occurs are written to the error flag field 8a, the block number field 8c and a time field 8d, respectively, in the error register 8.

Next, the operation of the failure detection circuit will be described referring to FIG. 11. The random logic unit 2, which is one of the random logic units included within the integrated circuit, processes a signal inputted through the input signal conductor 1 and outputs the processed result to the output signal conductor 3. For simplification of description, it is assumed herein that the output data of the random logic unit 2 is uniquely determined depending on the input data. The integrated circuit inputs data to the random logic unit 2 through the input signal conductor 1 and reads out the processed result in response to the input data from the random logic unit 2 through the output signal conductor 3.

In order to check if the random logic unit 2 gives a proper output in response to an input, the following process is carried out.

As concerns the error detection, the failure detection circuit conducts the same process as that shown in the first preferred embodiment.

When a signal is inputted to the random logic unit 2 through the input signal conductor 1, an output from the random logic unit 2 and an expected pattern of the test comparison ROM 4 having the address outputted by the ROM address generating unit 5a are compared in comparator 6, and then information as to whether or not the error exists is given to the error processing circuit 7a through a signal conductor 11.

The error processing circuit 7a makes a judgment whether or not an error occurs from the result delivered through the signal conductor 11. In the case of no error, the error processing circuit 7a does nothing, while in the case of error, it carries out the following process.

The error processing circuit 7a reads the present time given by the timer 95, and then writes the error flag, the details of the error and the error code representing the time when the error occurs in the error register 8. For notification in the case of error, the error processing circuit 7a of FIG. 11 sets the error flag in the error register 8 of FIG. 2, and writes the details of the error and the error code representing the time when the error occurs in the error register 8. The outside CPU 103 shown in FIG. 1 which is connected to the integrated circuit reads the content of the error register 8 and may also clear the same. There may be an arrangement where the error processing circuit 7a can make an interrupt in the outside CPU 103 connected to the integrated circuit by the interrupt signal when the error occurs. Furthermore, the failure detection circuit may have an arrangement including a plurality of error registers, which serve to store test results of random logic units other than the above-mentioned random logic unit. Moreover, patterns of high frequency of appearance may be selected for use as the expected patterns of the self-test, thereby improving the malfunction detection capability.

Thus, the apparatus employing the integrated circuit which includes the failure detection circuit can prevent the whole apparatus from performing a wrong operation even if the integrated circuit has malfunction because the apparatus correctly perceives the details of the error and the time when the error occurs by detecting the error immediately and making an investigation on the error, and then properly conducts an error process.

In the failure detection system, not only when the integrated circuit breaks down while the apparatus is in operation, but also when the apparatus is in operation under such severe conditions as cause malfunction (temperature, electric field, magnetic field, electromagnetic radiation. radioactive rays or the like) and when the integrated circuit has temporary malfunction, the malfunction of the integrated circuit is detected on real time, so that the apparatus can continue its operation by using alternative means to the means that the integrated circuit provides at that time only while the integrated circuit has malfunction.

Furthermore, a failure detection system using the combination of the above preferred embodiments would achieve an improvement in failure detection ratio.

Figure 19:
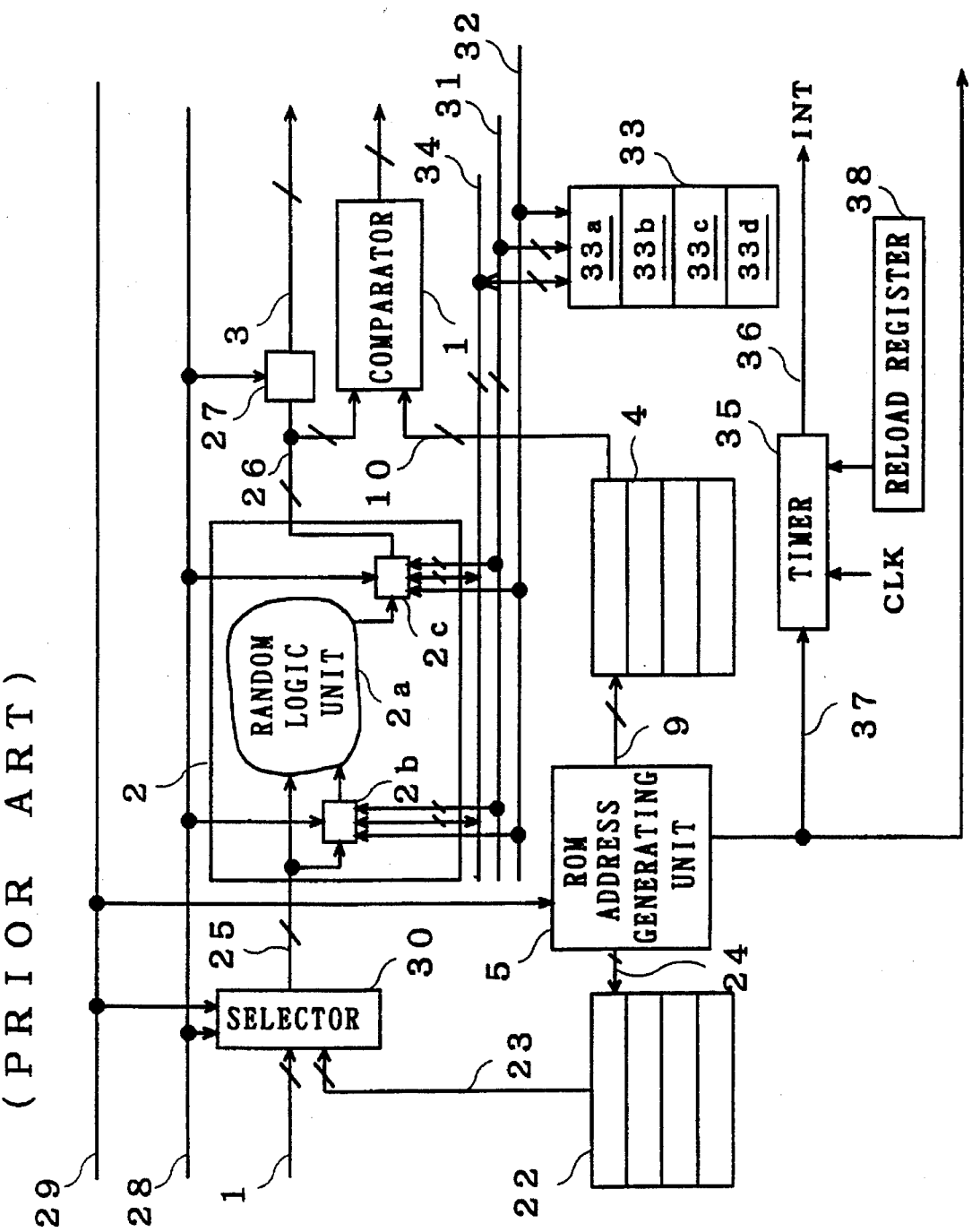
FIG. 19 is a block diagram showing another configuration of the conventional failure detection circuit.

In addition, there may be an arrangement in the failure detection system in accordance with the above preferred embodiments where the devices 101, 102 and the like start the self-test under the control of the timer as shown in FIG. 19. There may be another arrangement where a reset signal 98 inputted from the outside of the device 101, as shown in FIG. 13A, causes the self-test enable signal to be delivered from the latch 96 through the signal conductor 29 to the failure detection circuit 101*a*, to thereby make the failure detection circuit 101*a* conduct the self-test. As can be seen from FIG. 13B, the reset signal 98 rises at the time $t_0$. The latch 96 makes the self-test enable signal high level at the time $t_1$. The failure detection circuit 101*a* starts the self-test operation at the time $t_1$ and finishes the self-test operation at the time $t_2$. After finishing the self-test, the failure detection circuit 101*a* makes the reset signal 98 to be delivered to the latch 96, thus making the self-test enable signal low level.

While the invention has been shown and described in detail, the foregoing description is in all aspects illustrative and not restrictive. It is therefore understood that numerous modifications and variations can be devised without departing the scope of the invention.

I claim:

1. A failure detection system for detecting failure of at least one functional block provided within an integrated circuit, comprising:

monitoring means having a memory for storing information of at least one predetermined signal, for monitoring an input signal which is inputted to said at least one functional block to be processed therein and giving a notification that specific one of said at least one predetermined signal is inputted, when said input signal is in agreement with said specific one;

expected value storage means connected to said monitoring means, for storing data concerning a signal which is expected to be outputted from said at least one functional block if said at least one predetermined signal is properly processed by said at least one functional block, and outputting data corresponding to said specific one which is notified by said monitoring means;

comparator means for comparing an output signal from said at least one functional block with said data outputted from said expected value storage means and outputting a comparison result; and processing means for receiving said comparison result, and rewriting information of said at least one predetermined signal stored in said monitoring means and said data stored in said expected value storage means corresponding to said at least one predetermined signal based on at least one of said specific one, said output signal and said data from said expected value storage means, on the occasion that said comparison result indicates disagreement.

2. The failure detection system of claim 1, wherein said memory has a plurality of first registers for storing information concerning said at least one predetermined signal, said plurality of first registers have addresses, and said processing means comprises an input pattern control unit for receiving an address signal and a new predetermined signal corresponding to said address signal and replacing said at least one predetermined signal stored in said plurality of first registers having said address indicated by said address signal with said new predetermined signal.

3. The failure detection system of claim 2, wherein said input pattern control unit comprises an address decoder for decoding said address signal and commanding said plurality of first registers having said address indicated by said address signal to store said new predetermined signal therein.

4. The failure detection system of claim 3, wherein said expected value storage means comprises a plurality of second registers provided so as to correspond to said plurality of first registers, having the same address as corresponding said plurality of first registers, and storing said data concerning said signal which is expected to be outputted in response to said at least one predetermined signal stored in said plurality of first registers, and said processing means further comprises an expected pattern control unit for receiving new data corresponding to said address signal of said new predetermined signal and replacing said data stored in said plurality of second registers having said address indicated by said address signal with said new data.

5. The failure detection system of claim 4, wherein said at least one predetermined signal includes a plurality of predetermined signals consisting of a plurality of bits respectively, said monitoring means further comprises:

a detection unit for comparing said at least one predetermined signal stored in said plurality of first registers with said input signal to be inputted to said at least one functional block and outputting a signal indicating said plurality of first registers which stores said specific one which is in agreement with said input signal to be inputted to said at least one functional block; and an encoder for encoding information of a position of said plurality of first registers storing said specific one which is in agreement from said signal outputted from said detection unit to generate a signal indicating said position to be outputted, and said expected value storage means further comprises a decoder for decoding said signal outputted from said encoder to designate said plurality of second registers.

6. The failure detection system of claim 1, further comprising
malfunction verification means provided between said expected value storage means and said comparator means, for making a choice whether or not to change said data outputted from said expected value storage means to said comparator means.

7. The failure detection system of claim 1, wherein
said expected storage means comprises discrimination means for discriminating predetermined signals which correspond to the same signal which is expected to be outputted among said plurality of predetermined signals.

8. The failure detection system of claim 1, wherein
said processing means further comprises a timer indicating time for use of said integrated circuit, and
said processing means outputs data of said time for use of said integrated circuit at the moment when said comparison result shown by said comparator means indicates disagreement and at least one of said specific one notified by said monitoring means, said output signal from said at least one functional block and said data outputted from said expected value storage means, on the occasion that said comparison result indicates disagreement.

9. The failure detection system of claim 1, wherein
said processing means comprises:
third registers for storing information concerning at least one of said specific one notified by said monitoring means, said output signal from said at least one functional block and said data outputted from said expected value storage means on the occasion that said comparison result indicates disagreement; and
an error processing circuit for outputting error information about at least one of said specific one notified by said monitoring means, said output signal from said at least one functional block and said data outputted from said expected value storage means, on the occasion that said comparison result indicates disagreement, and a signal indicating said comparison result shows disagreement to said third registers.

10. The failure detection system of claim 9, wherein
said at least one functional block includes a plurality of functional blocks,
said error processing circuit includes a plurality of error processing units each provided so as to correspond to each of said plurality of functional blocks,
each of said plurality of error processing units further comprises fourth registers for storing a number designating corresponding one of said plurality of functional blocks, and
said each of said error processing units outputs a signal expressing said number designating said corresponding one of said plurality of functional blocks, information concerning said specific one given by said monitoring means and said signal indicating said comparison result shows disagreement to said third registers.

11. The failure detection system of claim 10, wherein
said monitoring means includes an input pattern storing portion having a plurality of fourth registers with addresses for storing said at least one predetermined signal, and gives a notification which said plurality of fourth registers stores said at least one predetermined signal which is in agreement with said input signal inputted, and
said each of said error processing units further comprises a multiplexer connected to said plurality of fourth registers provided within said each of said error processing units, said comparator means and said monitoring means, for receiving said number designating said corresponding one of said plurality of functional blocks from said plurality of fourth registers, said comparison result from said comparator means and said notification from said monitoring means and outputting said error information.

12. A failure detection system for detecting failure of at least one functional block provided within an integrated circuit, comprising:
monitoring means for monitoring an input signal inputted to said at least one functional block to be processed therein and giving a notification that specific one of predetermined signals is inputted when said input signal is in agreement with said specific one;
expected value storage means connected to said monitoring means, for storing data concerning a signal which is expected to be outputted from said at least one functional block if said predetermined signal is properly processed by said at least one functional block, and outputting data corresponding to said specific one which is notified by said monitoring means;
comparator means for comparing an output signal from said at least one functional block with said data outputted from said expected value storage means and outputting a comparison result; and
malfunction verification means provided between said expected value storage means and said comparator means, for making a choice whether or not to change said data outputted from said expected value storage means to said comparator means.

13. The failure detection system of claim 12, wherein
said output signal from said at least one functional block and said data outputted from said expected value storage means consists of a plurality of bits, respectively, and
said malfunction verification means comprises exclusive OR circuits as many as the number of bits of said data outputted from said expected value storage means, each having one input for receiving a predetermined bit of said data outputted from said expected value storage means and the other input for receiving a change instruction signal.

14. The failure detection system of claim 12, wherein
said monitoring means has a memory for storing information of said at least one predetermined signal,
said failure detection system further comprising:
processing means for receiving said comparison result from said comparator means, and rewriting said information of said at least one predetermined signal stored in said monitoring means and said data stored in said expected value storage means corresponding to said at least one predetermined signal based on at least one of said specific one which is notified by said monitoring means, said output signal from said at least one functional block and said data outputted from said expected value storage means, on the occasion that said comparison result indicates disagreement, and wherein
said processing means comprises:
first registers for storing information concerning at least one of said specific one which is notified by said monitoring means, said output signal from said at least one functional block and said data outputted from said expected value storage means on the occasion that said comparison result indicates disagreement; and an error processing circuit for outputting error information about at least one of said specific one which is notified by said monitoring means, said output signal from said at least one functional block and said data outputted from said expected value storage means on the occasion that said comparison result indicates disagreement, and a signal indicating that said comparison result shows disagreement to said first registers.

15. A failure detection system for detecting failure of at least one functional block provided within an integrated circuit, comprising:

monitoring means for monitoring an input signal inputted to said at least one functional block to be processed therein and giving a notification that specific one of a plurality of predetermined signals is inputted when said input signal is in agreement with said specific one;

expected value storage means connected to said monitoring means, for storing data concerning signals which are expected to be outputted from said at least one functional block if said plurality of predetermined signals are properly processed by said at least one functional block, having a discrimination means for discriminating predetermined signals which correspond to the same signal which is expected to be outputted among said plurality of predetermined signals, and outputting data corresponding to said specific one which is notified by said monitoring means; and comparator means for comparing an output signal from said at least one functional block with said data outputted from said expected value storage means and outputting a comparison result.

16. The failure detection system of claim 15, wherein said monitoring means comprises:

a decoder for decoding said input signal inputted to said at least one functional block;

an OR circuit for discriminating an output from said decoder;

an address generating unit for receiving said output from said decoder directly or through said OR circuit, and generating an address according to said output from said decoder to be outputted; and a read-only memory for outputting data stored at said address outputted by said address generating unit.

17. The failure detection system of claim 15, wherein said monitoring means has a memory for storing information of said plurality of predetermined signals, said failure detection system further comprising:

processing means for receiving said comparison result from said comparator means, and rewriting information about any of said plurality of predetermined signals stored in said monitoring means and said data stored in said expected value storage means corresponding to said at least one predetermined signal based on at least one of said specific one which is notified by said monitoring means, said output signal from said at least one functional block and said data outputted from said expected value storage means, on the occasion that said comparison result indicates disagreement, and wherein said processing means comprises:

first registers for storing information concerning at least one of said specific one which is notified by said monitoring means, said output signal from said at least one functional block and said data outputted from said expected value storage means on the occasion that said comparison result indicates disagreement; and an error processing circuit for outputting error information about at least one of said specific one which is notified by said monitoring means, said output signal from said at least one functional block and said data outputted from said expected value storage means on the occasion that said comparison result indicates disagreement, and a signal indicating that said comparison result shows disagreement to said first registers.

18. A failure detection system for detecting failure of at least one functional block provided within an integrated circuit, comprising:

monitoring means for monitoring an input signal inputted to said at least one functional block to be processed therein and giving a notification that specific one of predetermined signals is inputted when said input signal is in agreement with said specific one;

expected value storage means connected to said monitoring means, for storing data concerning a signal which is expected to be outputted from said at least one functional block if said predetermined signal is properly processed by said at least one functional block, and outputting data corresponding to said specific one which is notified by said monitoring means;

comparator means for comparing an output signal from said at least one functional block with said data outputted from said expected value storage means and outputting a comparison result; and processing means having a timer for indicating time for use of said integrated circuit, for outputting data indicating said time for use of said integrated circuit at the moment when said comparison result indicates disagreement and at least one of said specific one which is notified by said monitoring means, said output signal from said at least one functional block and said data outputted from said expected value storage means, on the occasion that said comparison result indicates disagreement.

19. The failure detection system of claim 18, wherein said processing means comprises:

first registers for storing information of a signal indicating that said comparison result shows disagreement, notification concerning said specific one given by said monitoring means and information concerning said data indicating said time or use of said integrated circuit; and an error processing circuit for outputting error information including at least information about said signal indicating that said comparison result shows disagreement, at least one of said specific one which is notified by said monitoring means, said output signal from said at least one functional block and said data outputted from said expected value storage means, on the occasion that said comparison result indicates disagreement, and information concerning said data indicating said time for use of said integrated circuit to said first registers.

20. The failure detection system of claim 19, wherein said error processing circuit includes a plurality of error processing circuits provided so as to correspond to said plurality of functional blocks respectively, each of said error processing circuits further comprises second registers for storing a number designating corresponding one of a plurality of functional blocks, and said first registers are provided so as to correspond to said plurality of functional blocks respectively and have respective addresses, each of said first registers comprises a plurality of storage regions each for storing said error information.

21. The failure detection system of claim 20, wherein said each of said plurality of error processing circuits is connected to said comparator means and said timer to receive said comparison result from said comparator means and said time for use of said integrated circuit from said timer, and comprises a multiplexer for outputting a signal expressing said error information.

* * * * *

UNITED STATES PATENT AND TRADEMARK OFFICE
CERTIFICATE OF CORRECTION

PATENT NO. : 5,617,429
DATED : April 1, 1997
INVENTOR(S) : Kouji GOTO

It is certified that error appears in the above-indentified patent and that said Letters Patent is hereby corrected as shown below:

On the title page, the Foreign Application Priority Data, Item [30], is missing. It should read:

-- [30]

Aug. 30, 1993  [JP]  Japan..........5-214116(P).--

Signed and Sealed this

Tenth Day of June, 1997

*Attest:*

BRUCE LEHMAN

*Attesting Officer*    Commissioner of Patents and Trademarks